US011172033B2

(12) United States Patent
Dandra et al.

(10) Patent No.: US 11,172,033 B2
(45) Date of Patent: Nov. 9, 2021

(54) METHOD FOR SERVICE PRIORITIZATION IN ELECTRONIC DEVICE COMPRISING MULTIPLE SIMS

(71) Applicant: SAMSUNG ELECTRONICS CO., LTD., Suwon-si (KR)

(72) Inventors: Prasad Basavaraj Dandra, Bangalore (IN); Lalit Kumar Pathak, Bangalore (IN); Lalith Kumar, Bangalore (IN); Mangesh Ingale, Bangalore (IN); Ramkumar Thirumalli Sureshsah, Bangalore (IN); Tushar Vrind, Bangalore (IN); Umasankar Ceendhralu Baskar, Bangalore (IN); Krishna Sumath Vemuri, Bangalore (IN); Vijay Ganesh Surisetty, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/938,014

(22) Filed: Jul. 24, 2020

(65) Prior Publication Data
US 2021/0029205 A1 Jan. 28, 2021

(51) Int. Cl.
*H04L 29/08* (2006.01)
*H04W 8/18* (2009.01)

(52) U.S. Cl.
CPC ............ *H04L 67/16* (2013.01); *H04W 8/183* (2013.01)

(58) Field of Classification Search
CPC ..................................................... H04L 67/16
See application file for complete search history.

(56) References Cited

U.S. PATENT DOCUMENTS

| 2005/0176445 A1* | 8/2005 | Qu ...................... H04W 72/005 455/458 |
| 2012/0149372 A1* | 6/2012 | Lee ........................ G01S 5/0263 455/435.1 |
| 2013/0029726 A1 | 1/2013 | Berionne et al. |
| 2016/0112084 A1* | 4/2016 | Parron ................. H04B 1/3816 455/558 |
| 2018/0132289 A1* | 5/2018 | Zhao ..................... H04W 48/10 |

FOREIGN PATENT DOCUMENTS

| WO | 2015/054159 | 4/2015 |
| WO | 2015/015111 | 10/2015 |

OTHER PUBLICATIONS

3GPP TS 23.201, Technical Specification (431 pages).

\* cited by examiner

*Primary Examiner* — Hsinchun Liao
(74) *Attorney, Agent, or Firm* — F. Chau & Associates, LLC

(57) ABSTRACT

Embodiments herein disclose a method for service prioritization in an electronic device comprising a plurality of SIMs associated with a single RF resource within the electronic device. The method includes sending, by an RF controller of the electronic device, a response to a second SIM to access the service associated with a second network entity. Further, the method includes configuring, by the RF controller, a signalling message comprising a category of service. The category of service indicates a priority of the service to be accessed by the second SIM. Further, the method includes sending the signalling message comprising the category of service to the second network entity.

20 Claims, 17 Drawing Sheets

METHOD FOR SERVICE PRIORITIZATION IN ELECTRONIC DEVICE COMPRISING MULTIPLE SIMS

CROSS REFERENCE TO RELATED APPLICATIONS

This application claims priority under 35 U.S.C. § 119 to Indian Application No. P201941030193, filed Jul. 26, 2019 and Indian Application No. 201941030193, filed Jul. 23, 2020 in the Intellectual Property Indian Office, the disclosures of which are incorporated by reference herein in their entireties.

TECHNICAL FIELD

The present disclosure relates to generally to wireless communications and more particularly to a service prioritization method in an electronic device comprising a plurality of subscriber identity modules (SIMs).

DISCUSSION OF THE RELATED ART

Fifth generation mobile telecommunications technology (5G) is a service-based architecture that is expected to grow multiple new services for different applications in terms of time critical, high data rate, and mass-market devices. Service prioritization plays a key role in a wireless communication to provide a best effort for delay-sensitive services. Each Radio Access Technology (RAT) such as fourth generation Long Term Evolution (LTE) and 5G has different Quality of Service (QoS) parameters to differentiate the services at the user's mobile device ("electronic device", "User Equipment (UE)", etc.) and a wireless network.

FIG. 1 illustrates a 5G service flow management 1000. The concept of QoS in LTE and 5G differ in terms of bearers and flow. In LTE, Evolved Packet System (EPS) bearer ID (EBI) is used to distinguish between different QoS, whereas 5G uses QoS flows, each identified by a QoS flow ID (QFI). The 5G QoS flows are mapped in an Access Network (AN) 200 to Data Radio Bearers (DRBs). This differs from 4G LTE where the mapping is one to one between evolved packet core (EPC) and radio bearers. In 5G, Non-access stratum (NAS) level packet filters in an electronic device 100 and in a fifth generation core (5GC) 300 associate uplink (UL)/downlink (DL) packets with QoS flows. At the NAS level, the QoS flow is characterized by QoS profile provided by the 5GC to the next-generation radio access network for 5G (NG-RAN), and QoS rules provided by the 5GC to the electronic device 100. Access Stratum (AS)-level mapping rules prescribed in the electronic device 100 and in the NG-RAN associate UL/DL QoS flows with the DRBs. At the AS level, the DRB defines packet treatment on a radio interface.

In current proposals in 3$^{rd}$ Generation Partnership Project (3GPP), service prioritization is based on the QoS parameters, where the QoS parameters are RAT specific. For example, QoS Class Identifier (QCI) and QoS Flow Identifier (QFI) are used in the LTE and the 5G, respectively. With upgrades in technology new QoS indicators or parameters continue to be introduced for new versions of systems. Hence the new services that are being introduced should be managed with a common solution adapting to the changes in technology.

A mobile device including multiple SIMS is referred to as a multi-SIM device. Each of the SIMS may serve as a SIM for handling a particular function(s) or for use with a particular RAT or set of RATs. A first SIM might be designated for a packet switching (PS) protocol data communication (e.g., "background data") whereas a second SIM might be designated for an emergency communication (EMC) call. In another example, a first SIM may be used for communication with an LTE system whereas a second SIM is designated for uses that include certain services of a 5G system. For instance, as a mobile device travels from a first coverage area where certain 5G services are not available to a second coverage area where such services are available, or vice versa, the mobile device may switch its operations between the first and second SIMS.

SUMMARY

Embodiments of the inventive concept provide a method for service prioritization in an electronic device having multiple SIMs associated with a single, shared RF resource within the electronic device, where the service prioritization may not waste resources in Multi-SIM environment. A priority of the service may be dynamically changed during the service. Information associated with the service may be exchanged between the SIMs. Embodiments may also support scenarios where there is a need to change priority of the service during a life of the service based on user needs.

Embodiments may group one or more services in a category based on service type and priority of service and assign an identifier (ID) for each category. The category ID may be communicated to a network assisting the electronic device, and the network may prioritize the services in multi-SIMs associated with the electronic device. These measures may avoid both a waste in resources at the network and performance degradation at the electronic device due to RF switching or blackouts.

In an embodiment, a method for service prioritization in an electronic device comprising a plurality of SIMs associated with a single RF resource within the electronic device (e.g., a shared RF front end and shared antennas). The method includes registering, by a RF controller of the electronic device, a first SIM from the plurality of SIMs with a first network entity in a wireless network and a second SIM from the plurality of SIMs with a second network entity in the wireless network. Further, the method includes receiving, by the RF controller of the electronic device, a request from the first or the second SIM to access a service associated with the first and second network entity, respectively. Further, the method includes sending, by the RF controller of the electronic device, a response to the first or second SIM to access the service associated with the corresponding network entity. Further, the method includes configuring a signalling message comprising a category of service, wherein the category of service indicates a priority of the at least one service to be accessed by the corresponding SIM.

In an embodiment, the method includes receiving, by the RF controller of the electronic device, a request from the first SIM to access at least one service associated with the first network entity. Further, the method includes determining, by the electronic device, a category ID of the at least one service to be accessed by the first SIM. Further, the method includes detecting, by the electronic device, a priority associated with the category of the at least one service to be accessed by the second SIM. Further, the method includes detecting, by the electronic device, whether the priority associated with the category ID of the at least one service to be accessed by the first SIM is greater or less than the priority associated with the category of the at least one service on-going with the second SIM. Further, the method includes preforming, by the RF controller of the electronic device, one of granting the request of the first SIM or second SIM to access at least one service based on priority and associated with the corresponding network entity in response to detecting that the priority associated with the category of the at least one service to be accessed by the first SIM is less than the priority associated with the category of the at least one service on-going with the second SIM or vice versa, and sending an update message comprising the category identifier of the at least one service accessed by the first SIM to the second network entity or vice versa, and rejecting the request of the first SIM to access at least one service associated with the second network entity in response to detecting that the priority associated with the category of the at least one service to be accessed by the first SIM is greater than the priority associated with the category of the at least one service on-going with the second SIM.

In an embodiment, the method includes receiving, by the network entity which needs to pause the services, the update message comprising the category identifier representing at least one higher priority service accessed by the other SIM from the electronic device. Further, the method includes performing, by this network entity, blocking the lower priority service and avoiding sending a paging request to the electronic device.

In an embodiment, the method includes sending, by the RF controller of the electronic device, a response to the first SIM to access the at least one service associated with the first network entity. Further, the method includes configuring, by the RF controller of the electronic device, a signalling message comprising a category of service, wherein the category of service indicates a priority of the at least one service to be accessed by the first SIM. Further, the method includes sending, by the electronic device, the signalling message comprising the category of service to the first network entity.

In an embodiment, when the at least one service is on-going with the second SIM, and sending the update message, the method comprising detecting, by the RF controller of the electronic device, a service completion indication in that update message from the first SIM to resume at least one service or access a new service with the first network entity and sending, by the RF controller of the electronic device, an update message indicating the service completion of the first SIM to the second network entity, and allowing, by the RF controller of the electronic device, the second SIM to resume the at least one service or access a new service with the second network entity.

In an embodiment, when the priority of at least one service to be accessed by the first SIM has to be increased as deemed by an user of the electronic device or an application executed in the electronic device than the ongoing service on the second SIM, the method comprises dynamically changing the grouping of the selected services and associate it with higher priority category and indicating the new category to network entity by the first second SIM and the second SIM to pause the low priority services.

In an embodiment, where the method can be used to provide a preconfigure of priority of the service and associate it with category ID irrespective of its QoS/QFI value of the service as decided between the electronic device and an operator of the wireless network.

In an embodiment, configuring, by the RF controller of the electronic device and the network entity, the service prioritization based on the category identifier associated with the at least one service includes assigning a resource based on the priority indicated by the category ID using the assigned resource for availing the service between electronic device and the network entity.

In an embodiment, the electronic device may request resources with the wireless network using a service priority level of both current SIM as well as the other SIM whenever applicable. The wireless network entity may optimize its resource usage based on information of category id representing the priorities of services going on all other SIMs.

In an embodiment, the category identifier of the service is determined by a type of the service and a characteristics of the service.

In an embodiment, the category identifier is directly mapped to a specific service and define the priority for the category identifier.

In an embodiment, the category identifier of the service is included in the signalling message.

In an embodiment, the priority levels of the service is dynamically increased or decreased through changing its association with different priority category ID.

In an embodiment, the category identifier associated with the service is shared by the network entity to the electronic device in the paging message for the electronic device to decide if the electronic device wants to proceed with that the service or reject the electronic device. Further, the method can be used to take decision of the service based on comparing with category ID that represents the priority of the ongoing service in other SIM.

In an embodiment, the signalling message is one of a Radio Resource Control (RRC) message and a Non-access stratum (NAS) message.

In an embodiment, the signalling message comprise a time-bound information, where the time-bound information indicates an active time of a change in the category of the service to the second network entity.

In an embodiment, the time-bound information is determined by the category identifier of the at least one service.

Embodiments herein further relate to an electronic device for service prioritization. The electronic device includes an RF controller that registers a first SIM from the plurality of SIMs with a first network entity in a wireless network and a second SIM from the plurality of SIMs with a second network entity in the wireless network. Further, the RF controller receives a request from the second SIM to access a service associated with the second network entity. Further, the RF controller sends a response to the second SIM to access the service associated with the second network entity. The RF controller configures a signalling message comprising a category of service. The category of service indicates a priority of the service to be accessed by the second SIM. The RF controller sends the signalling message including the category of service to the second network entity.

BRIEF DESCRIPTION OF THE DRAWINGS

Embodiments of the inventive concept are illustrated in the accompanying drawings, throughout which like reference characters indicate corresponding parts in the various figures. The embodiments herein will be better understood from the following description with reference to the drawings, in which.

DETAILED DESCRIPTION OF EMBODIMENTS

Figure 1:
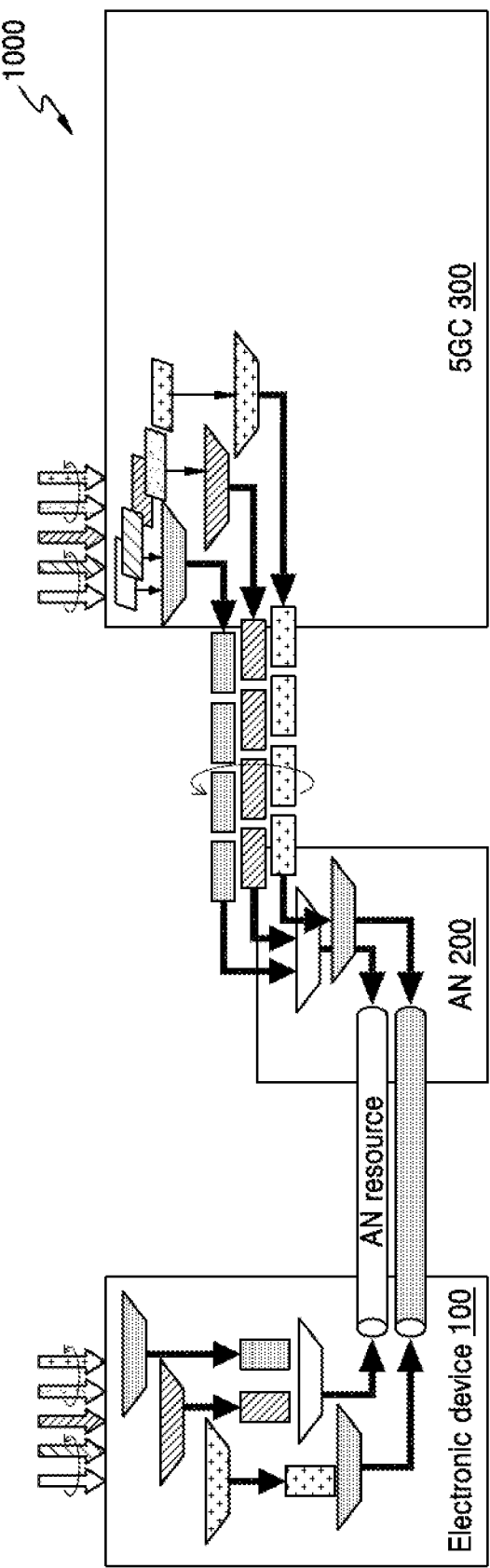
FIG. 1 is a block diagram of a 5G service flow management, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Herein, the phrase "RF request", when used in the context of a request made by a SIM, refers to a request for a communication to a network entity by an electronic device that includes the SIM. Similarly, the phrase "RF response" may be used to refer to a response sent to the SIM (typically by an RF controller of the electronic device) in reply to the RF request.

Embodiments herein disclose methods for service prioritization in an electronic device comprising a plurality of SIMs associated with a single RF resource, as summarized above. Unlike conventional methods and systems, the embodiments taught herein can be used to handle the service prioritization in an electronic device including a plurality of SIMs ("multi-SIM electronic device"), where the plurality of SIMS are associated with a single RF resource. The single RF resource may be a shared RF resource comprising, e.g., 1 Rx and 1 Tx (one receive antenna and one transmit antenna) or 2 Rx and 1 Tx (two receive antennas and one transmit antenna). The single RF resource may further include RF front end circuitry, such as a transceiver, amplifiers, filters, mixers, a modulator, a demodulator, etc. The RF resource may include switching circuitry to switch communication between the RF front end circuitry and the SIMS (one of the SIMS may be communicatively coupled to the RF front end circuitry at a time). The service prioritization may be accomplished without wasting resources. Embodiments may allow for dynamic changes in priority during the service, and exchange of information associated with the service between the SIMs of the electronic device as per user or application needs.

Further, embodiments can be used to provide a flexibility to change the service priority dynamically which can be negotiated between the electronic device and the wireless network to optimize the resources in the electronic device. Embodiments may allow the electronic device to know the priority of the service being requested by the wireless network, so that the electronic device and the wireless network efficiently handle the service prioritization in the electronic device.

Embodiments can be used to group one or more services in the category based on service type and priority of service and assign an identifier (ID) for each category. The category ID may be communicated to a network assisting the electronic device and the network to prioritize the services in associated multi-SIMs of the electronic device to avoid resource waste at the network and performance degradation at the electronic device due to RF switching or blackouts.

Figure 2:
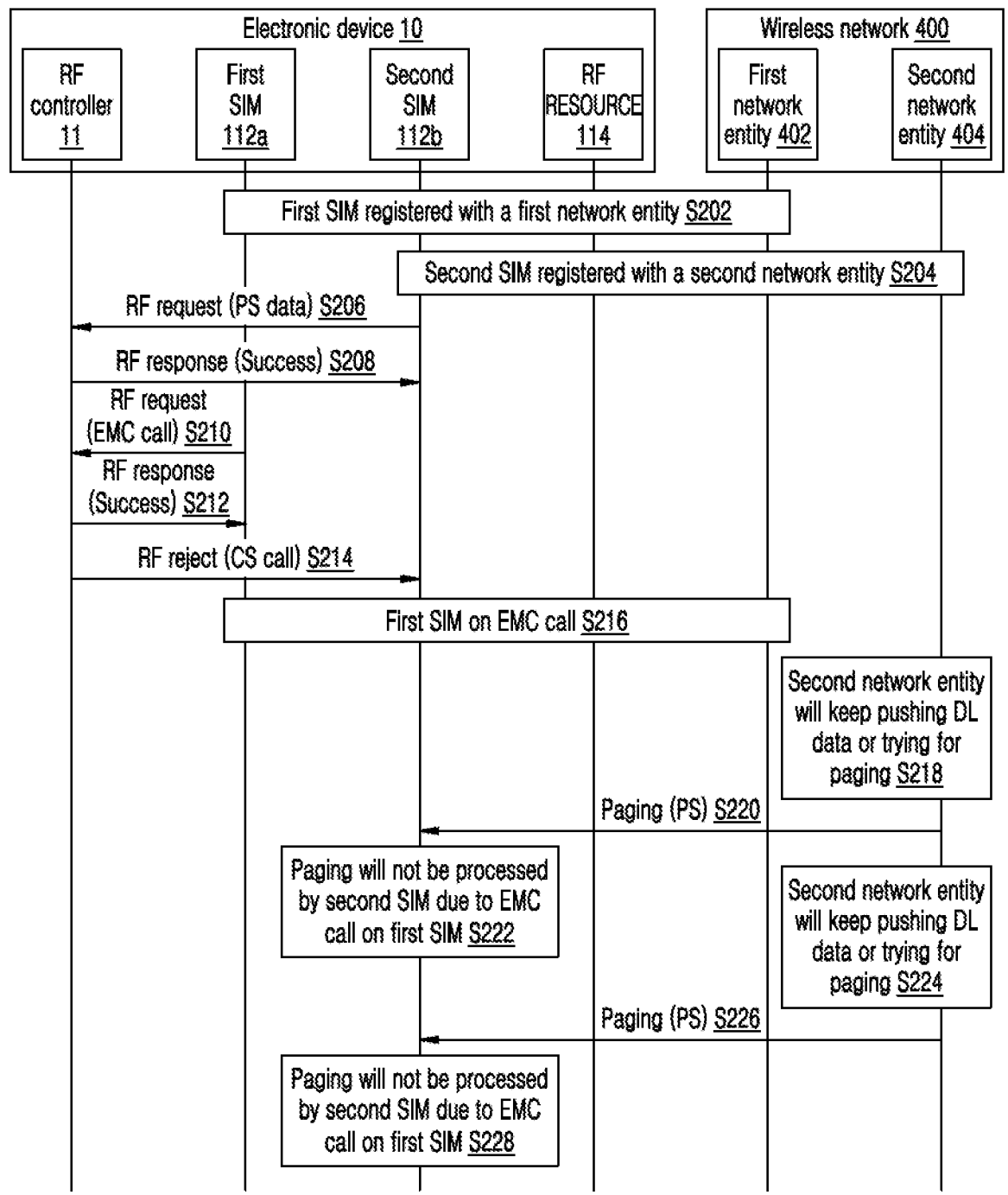
FIG. 2 is an example operation sequence diagram illustrating a service prioritization in a multi-SIM electronic device, when a first SIM handles an emergency call (EMC) call and a second SIM handles background data, according to prior art.

To facilitate an understanding of the inventive concept, prior art techniques will first be discussed in reference to FIGS. 2-5B. FIG. 2 is an example operation sequence diagram illustrating a prior art service prioritization protocol in an electronic device including a plurality of SIMs associated with a single RF resource. A scenario is illustrated in which a first SIM 112a of the electronic device handles an EMC call and a second SIM 112b of the electronic device handles background data. In a traditional dual-SIM dual-standby (DSDS) electronic device, RF resource sharing between SIMS happens based on a fixed procedure or fixed service prioritization among SIMs and there is no information to a network about the prioritization of the services considered by the electronic device for the corresponding SIMs. This leads to network resources being wasted. In an example, as shown in FIG. 2, at S202, a first SIM 112a is registered with a first network entity 402. At S204, a second SIM 112b is registered with a second network entity 404. At S206, the second SIM 112b sends an RF request for Packet Switching (PS) data to an RF controller 11. At S208, the RF controller 11 sends an RF response (e.g., success message) to the second SIM 112b based on the RF request. At S210, the first SIM 112a sends an RF request for an EMC call to the RF controller 11. At S212, the RF controller 11 sends an RF response (i.e., success message) to the first SIM 112a. At S214, the RF controller 110 sends an RF reject (i.e., CS call) to the second SIM 112b based on the RF request for the EMC call. (A CS call that was ongoing is terminated at S214 due to the initiation of the EMC call.)

At S216, the first SIM 112a is on the EMC call and at S218, the second network entity 404 will keep pushing downlink (DL) data or keep trying to page. At S220, the second network entity 404 sends the paging to the second SIM 112b. At S222, the paging will not be processed by the second SIM 112b due to the single (shared) RF resource 114 used for the EMC call on the first SIM 112a. At S224, the second network entity 404 will keep pushing the DL data or keep trying to page the second SIM 112b. At S226, the second network entity 404 sends the paging signals to the second SIM 112b. At S228, the paging will not be processed by the second SIM 112b due to the EMC call on the first SIM 112a.

In the above scenario, the second SIM 112b will not respond to paging from the second network entity 404, but the second network entity 404 keeps sending paging/downlink data on the second SIM 112b. This causes a waste of resources and the network might consider that the electronic device 10 has encountered radio link failure (RLF). Since the second SIM 112b is not responding to the second network entity request, this leads to the second SIM 112b and the second network entity being in "state mismatch".

Figure 3:
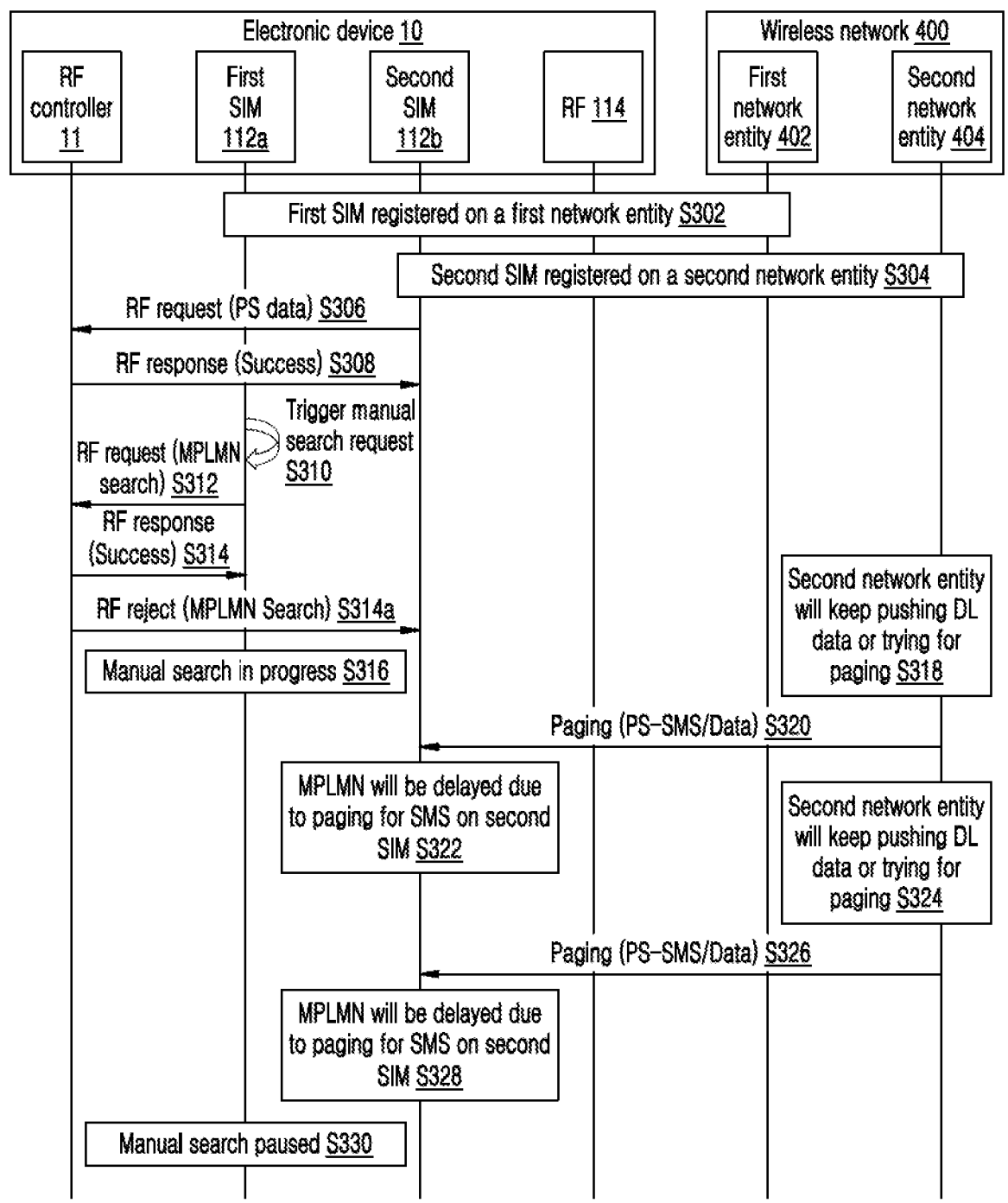
FIG. 3 is an example sequence diagram illustrating service prioritization in a multi-SIM electronic device, when a first SIM handles a manual search request received from a user of the electronic device and a second SIM performs data session or receives a public switch (PS) paging to initiate data session, according to prior art.

FIG. 3 is an example sequence diagram illustrating the service prioritization in the electronic device 10 including the plurality of SIMs associated with the single RF resource 114 when the first SIM 112a handles a manual search request and the second SIM 112b performs data session or receives PS paging to initiate data session, according to prior art.

At S302, the first SIM 112a is registered with the first network entity 402. At S304, the second SIM 112b is registered with the second network entity 404. At S306, the second SIM 112b sends an RF request for the PS data to the RF controller 11. At S308, the RF controller 11 sends the RF response (i.e., success message) to the second SIM 112b based on the RF request. At S310, the first SIM 112a triggers a manual search request received from a user of the electronic device 10.

At S312, the first SIM 112a sends an RF request for a MPLMN (Manual Public Land Mobile Network) search to the RF controller 11. At S314, the RF controller 11 sends the RF response (i.e., success message) to the first SIM 112a. At S316, the first SIM 112a performs the manual search. At S318, the second network entity 404 will keep pushing DL data or continue paging attempts. At S320, the network entity 404 sends the paging (for PS-SMS/data) to the second SIM 112b. At S322, the MPLMN will be delayed at the first SIM 112a due to the paging for the SMS or Data on the second SIM 112b. At S324, the second network entity 404 will keep pushing DL data or keep trying to page. At S326, the second network entity 404 sends the paging (for PS-SMS/data) to the second SIM 112b. At S328, the MPLMN will be delayed at the first SIM 112a due to paging for the SMS on the second SIM 112b. At S330, the manual search is paused at the first SIM 112a.

In other words, the manual search is requested on the first SIM 112a and the manual search request on the first SIM 112a is a higher priority than that for the second SIM 112b handling the data request until the time period of the manual search is completed. But, the electronic device 10 will respond for the data request or downlink packets in the second SIM 112b and hence manual search request on the first SIM 112a will be interrupted (as scan cannot be performed at all or cannot be performed continuously when the other SIM has data connection established). There may be no way to prioritize the first SIM user request, and this also results in a waste of network resources.

Figure 4:
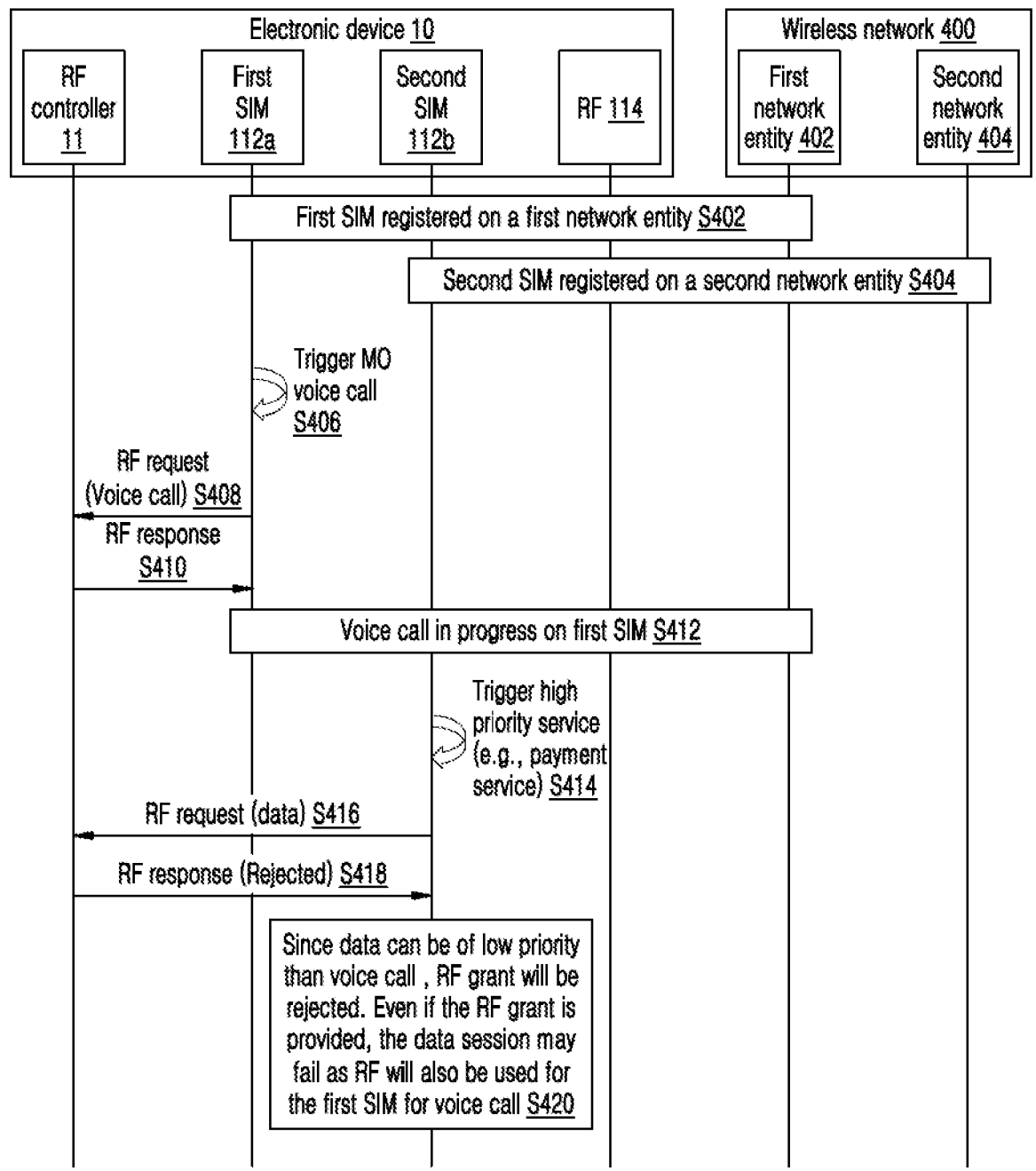
FIG. 4 is an example sequence diagram illustrating service prioritization in a multi-SIM electronic device, when a first SIM handles a voice call and a second SIM initially handles background data and then handles a financial payment transaction requested by the user of the electronic device, according to prior art.

FIG. 4 is an example sequence diagram illustrating the service prioritization in the electronic device 10 including the plurality of SIMs associated with the single RF resource 114 when the first SIM 112a handling the voice call and the second SIM 112b initially handling the background data and then handling a financial payment transaction requested by the user of the electronic device 100, according to prior art.

At S402, the first SIM 112a is registered with the first network entity 402. At S404, the second SIM 112b is registered with the second network entity 404. At S406, the first SIM 112a triggers an MO voice call request received from the user of the electronic device 100. Based on the MO voice call request, at S408, the first SIM 112a sends an RF request for the voice call to the RF controller 11. At S410, the RF controller 11 sends the RF response (i.e., success message) to the first SIM 112a. At S412, the voice call is in progress on the first SIM 112a. At S414, the second SIM 112b triggers a high priority service (e.g., payment service). At S416, the second SIM 112b sends the RF request for data access to the RF controller 11. At S418, the RF controller 11 sends the RF response (i.e., reject message) even though the request is of high priority for the user but still a data session, hence, it is considered lower priority to normal call and at S420, the RF grant will be rejected. Even if the RF grant is provided, the data session may fail as the RF resource 114 will also be used for the first SIM 112a for the voice call.

In such situations, there may be no way to prioritize the data session on the second SIM 112b over the voice call on the first SIM 112a for a certain amount of time. The electronic device 10 may have to continue to face disruption for the data session or in the worst case cannot use the data session at all due to the prioritized call on the first SIM 112a. This results in a poor user experience.

Figure 5A:
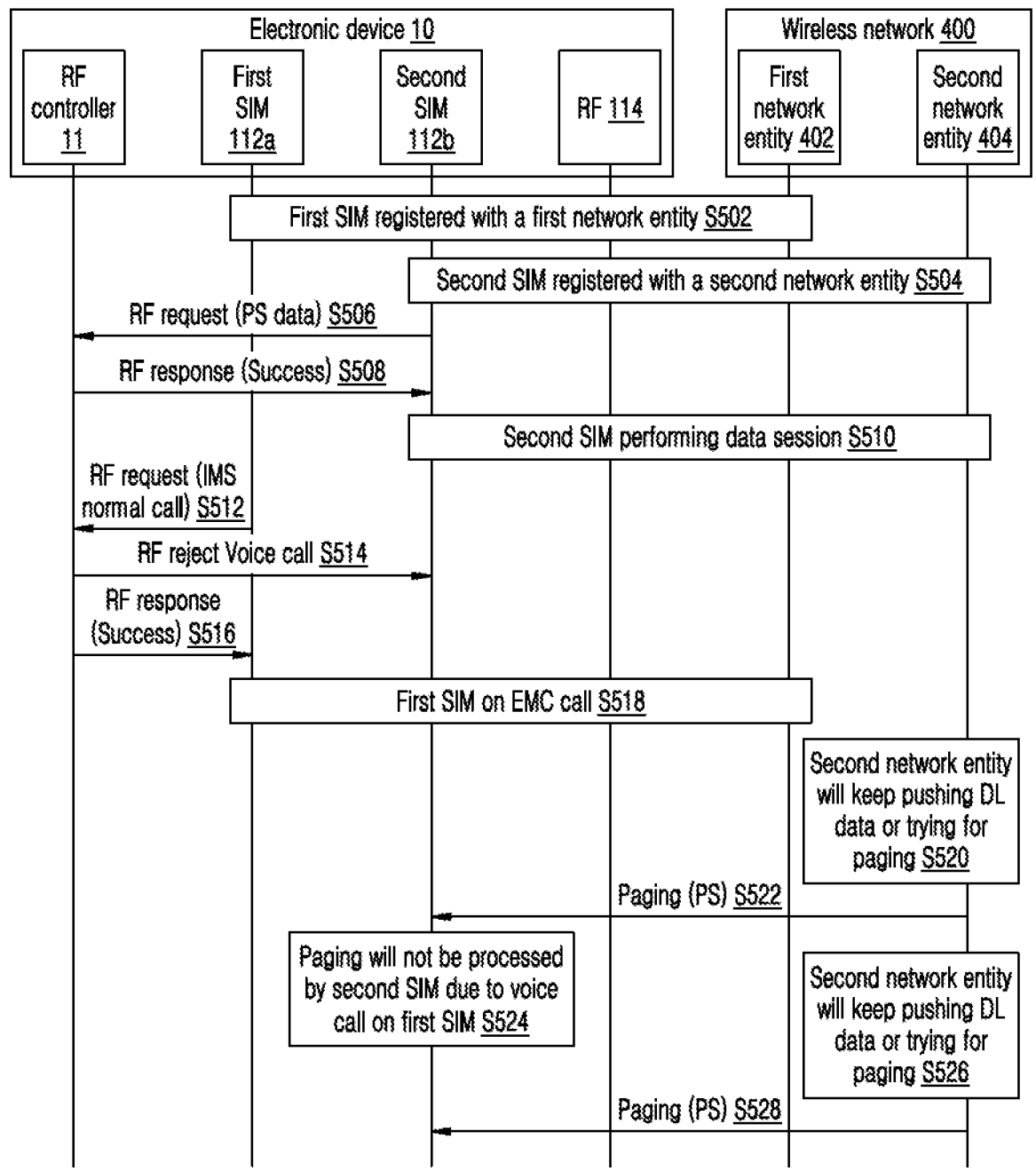
FIGS. 5A and 5B together illustrate an example sequence diagram illustrating service prioritization in a multi-SIM electronic device, when a first SIM handles a voice call and a second SIM handles an emergency call.
Figure 5B:
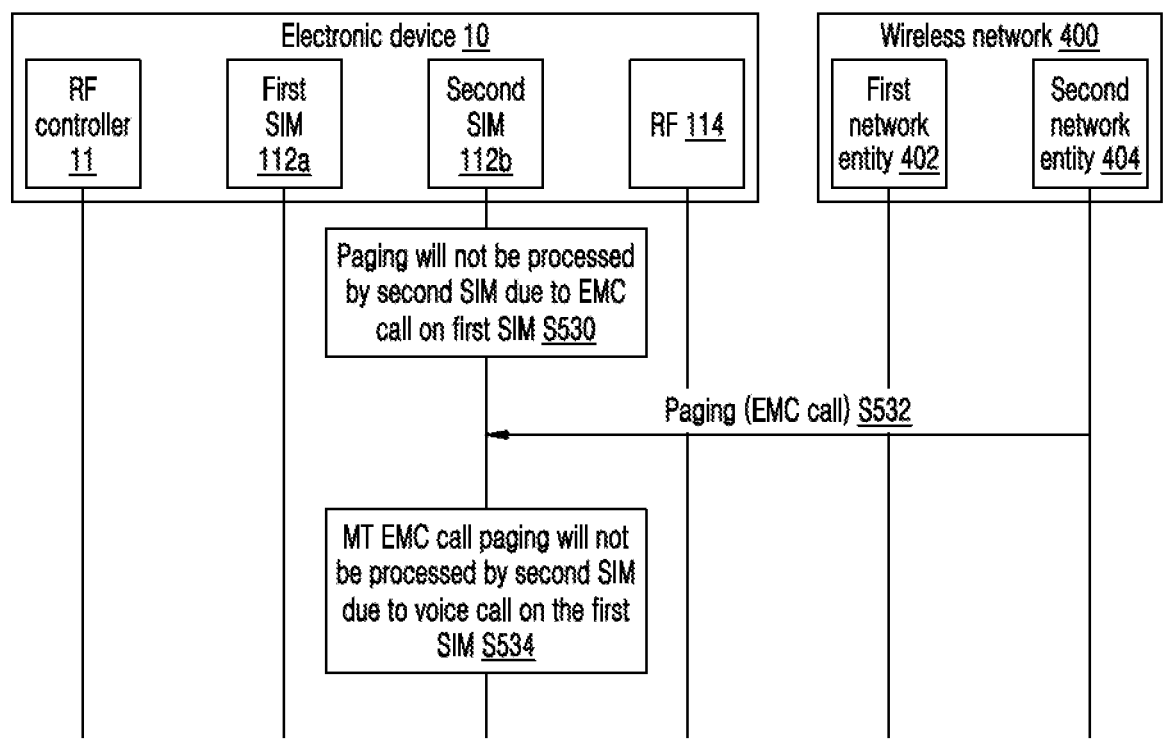

FIGS. 5A and 5B depict an example sequence diagram illustrating the service prioritization in the electronic device 10 including the plurality of SIMs associated with a single RF resource when the first SIM 112a handles a voice call and the second SIM 112b handles an emergency call, according to prior art.

At S502, the first SIM 112a is registered with the first network entity 402. At S504, the second SIM 112b is registered with the second network entity 404. At S506, the second SIM 112b sends an RF request for the PS data to the RF controller 11. At S508, the RF controller 11 sends the RF response (i.e., success message) to the second SIM 112b based on the RF request. At S510, the second SIM 112b performs the data session.

At S512, the first SIM 112a sends the RF request for an IMS normal call to the RF controller 11. At S514, the RF controller 11 sends the RF response (i.e., reject message for IMS normal call) to the second SIM 112b based on the RF request for the IMS normal call. At S516, the RF controller 11 sends an RF message (i.e., success message) to the first SIM 112a.

At S518, the first SIM 112a is on the IMS normal call and at S520, the second network entity 404 will keep pushing DL data or keep trying to page. At S522, the second network entity 404 sends the paging to the second SIM 112b. At S524, the paging will not be processed by the second SIM 112b due to the IMS voice call on the first SIM 112a. At S526, the second network entity 404 will keep pushing the DL data or trying to page the second SIM 112b. At S528 and 532, the second network entity 404 sends the paging to the second SIM 112b and sends paging for an EMC call, respectively. At S530 and S534, the paging for the DL data and for the EMC call will not be processed by the second SIM 112b due to the RF resource 114 being used for IMS normal call on the first SIM 112a.

Figure 6:
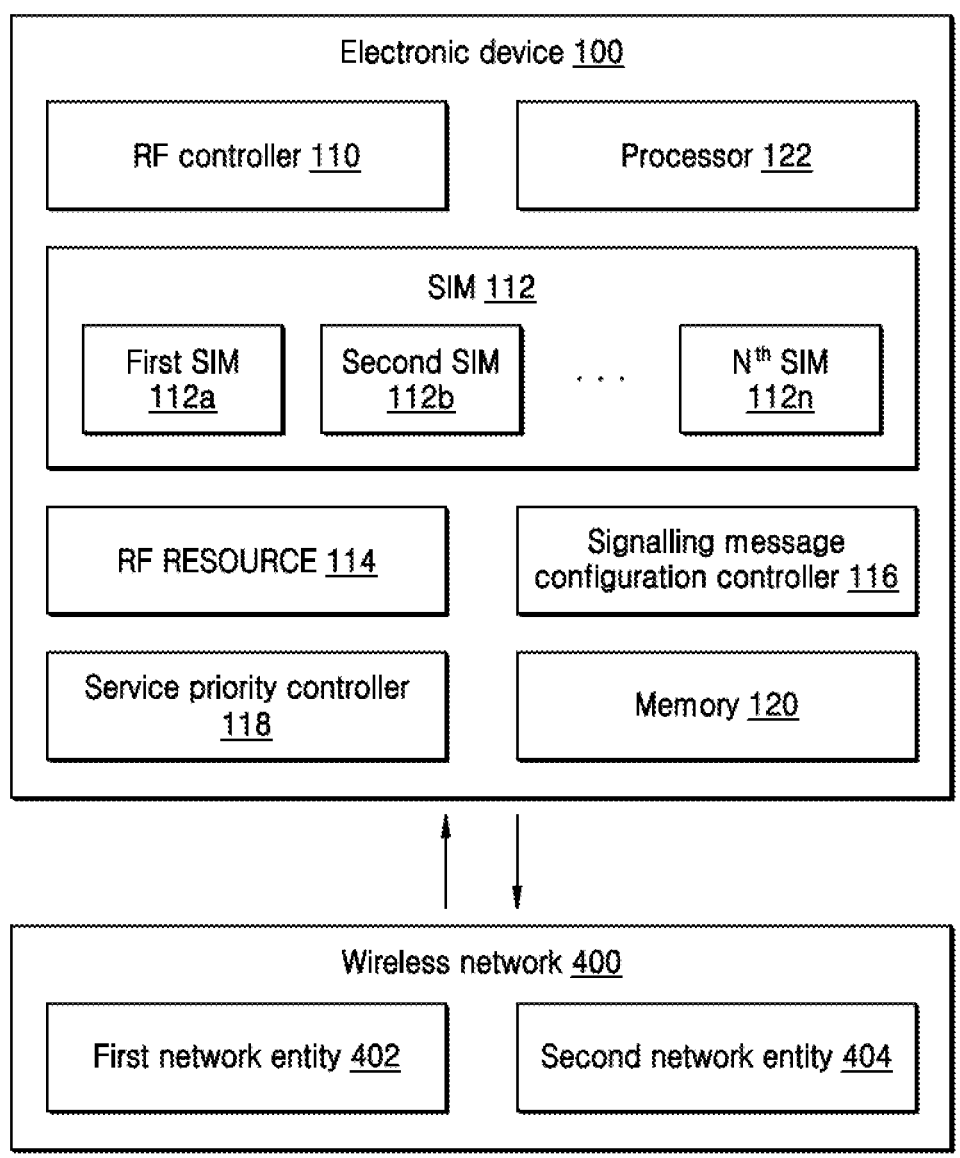
FIG. 6 illustrates various hardware elements of the electronic device for service prioritization, according to an embodiment as disclosed herein.

FIG. 6 illustrates various example hardware components of an electronic device 100 that handlesservice prioritization, according to an embodiment as disclosed herein. The electronic device 100 can be, for example, but not limited to a cellular phone, a smart phone, a Personal Digital Assistant (PDA), a wireless modem, a tablet computer, a laptop computer, an Internet of Things (IoT) device, a virtual reality device, and a smart watch.

The electronic device 100 includes an RF controller 110, the first SIM 112a, the second SIM 112b, n$^{th}$ SIM 112n (n=two or higher), the single, shared RF resource 114, a signalling message configuration controller 116, a service priority controller 118, a memory (120, and a processor 122. The processor 122 is coupled to the RF controller 110, the first SIM 112a, the second SIM 112b, n$^{th}$ SIM 112n, the single RF resource 114, the signalling message configuration controller 116, the service priority controller 118, and the memory 120. The single RF resource 114 may include, e.g., at least one transmit antenna, at least one receive antenna, and RF front end circuitry. The RF front end circuitry may include a transceiver, a transmit amplifier, a receive amplifier, filters, mixers, a modulator, and/or a demodulator, etc. The RF resource 114 may further include switching circuitry to switch communication between the RF front end circuitry and the different SIMs (in some cases, only one of the SIMs may be communicatively coupled to the RF front end circuitry of the RF resource 114 at a time). It is noted that a "single RF resource" to be shared between the SIMs does not preclude the possibility of including other RF resources within the electronic device 100 to perform functionality other than that described herein with respect to the SIMs.

The RF controller 110 is configured to register the first SIM 112a among the plurality of SIMs 112 with the first network entity 402 in the wireless network 400 and the second SIM 112b among the plurality of SIMs 112 with a second network entity 404 in the wireless network 400. Further, the RF controller 110 is configured to receive an RF request from the second SIM 112b to access a service associated with the second network entity 404. Further, the RF controller 110 is configured to send an RF response to the second SIM 112b to access the service associated with the second network entity 404. Further, the RF controller 110 may configure a signalling message including a category of service. The category of service indicates a priority of the service to be accessed by the second SIM 112b. Further, the RF controller 110 is configured to send the signalling message comprising the category of service to the second network entity 404. Moreover, the RF controller 110 is configured to receive a service response message from the second network entity 404.

In an example, the service or a group of services is classified into a category associated with a category identifier (ID) which is used by the electronic device 100 and the wireless network 400 during a service establishment. Since more than one service can be in the same category, the service category may be classified or defined such that service characteristics information (i.e. nature of service and attributes like delay tolerant, robustness, etc.) can also be derived from the category ID associated with the service category. In an embodiment, classification of one or a plurality of services into a service category is based on service characteristics associated with the service. In an example, consider, Category-ID=FFFF (1 byte MSB represents Group ID and 1 byte LSB represents service characteristics information.

In another example, classification of one or a plurality of services into the service category is based on priority of service and service characteristics associated with the service. The category ID is associated with the service category which indicates the priority of the service.

Further, the category ID associated with the service category may be included in a message from the electronic device 100 to the wireless network 400, which indicates the priority of the service. In an example, the message from the electronic device 100 to the wireless network 400 is one of a Radio Resource Control (RRC) message and/or a Non-access stratum (NAS) message.

With the electronic device 400, operations for prioritization of services and dynamically changing category ID to change priority of services may provide more flexibility in the wireless network 400 and effective utilization of radio resources in the electronic device 100.

Further, the category ID information associated with a group having one or more services may be shared by the wireless network 400 to the electronic device 100 in a paging message so that the electronic device 100 can know the priority of the service under request based on the included category ID. In another embodiment, the paging message from the wireless network 400 to the electronic device 100 includes the category ID. The paging message including the category ID can originate in either a core network or a RAN node. This information will be used by the electronic device 100 to decide if service is needed or not. Additionally, the wireless network 400 may choose not to page the electronic device 100 for services associated with lower category and page the electronic device 100 only for services associated with the same or higher category. In an embodiment, a higher category ID indicates the service has a higher priority compared to a service associated with a lower category ID. In an embodiment, for service prioritization the category ID associated with a service can also have a pre-defined priority associated with it agreed upon between the electronic device 100 (e.g., a UE) and the network. In another embodiment, for dynamic service prioritization the category ID associated with a service category is dynamically negotiated between the electronic device 100 and the wireless network 400 based on change in priority of service as deemed by user, application or network.

The classification of a service or group of services into service category may be based on different parameters like quality of service (QoS), a QoS Flow Identifier (QFI) or equivalents, and priority may be associated with the service and not dependent on a specific technology. The classification of service into category and the concept of using the category ID for indicating the priority of the service to the network 400 may remain the same, but as new services are added, and QoS (or other parameters) are defined for these services, those may be classified into already available categories or alternatively new categories can be added. The solution itself involving indicating category ID to the wireless network 400 by the electronic device 100 for service establishment or the wireless network 400 including the category ID in a paging message to the electronic device 100 may not have to be changed.

In another embodiment, all the services irrespective of its QoS/QFI requirements can be categorized into pre-defined service priority levels negotiated and agreed between the electronic device 100 and a network operator. The electronic device 100 may request resources with the wireless network 400 using the service priority level of both a current SIM as well as any of the other SIMs in the electronic device 100 whenever applicable. The wireless network 400 may optimize its resource usage based on information of priorities of services provided with respect to all other SIMs.

The information related to category of the service or change in category of the service due to priority deemed by the electronic device 100, the wireless network 400 or user may be communicated from the electronic device 100 to the network 400 using any existing signaling message or new signaling message, as depicted in the FIGS. 8-11. The signaling message can be one of RRC message and/or NAS message. This signaling message can also include a time-bound information parameter. Inclusion of the parameter will convey the network 400 that the change in category will be limited for mentioned time and if category is not changed to default values before the expiry of this time value then after timer expiry network and the electronic device 100 will fall back to the default category values. This will also be useful in case the electronic device 100 upgrades or downgrades the category of the service and then goes to an out of service (OOS) condition. In such cases, both electronic device 100 and the network 400 may change to a default value after timer expiry. If the electronic device 100 recovers to a registered state before the expiry of the timer then the electronic device 100 can complete the services and then update the category to return to default values.

Here, the time-bound values can be derived by the electronic device 100 and the network 400 based on the category ID shared by the electronic device 100 (specifically based on the service characteristic of that category). As an example, there may be unlimited time-bound for voice call and on the order of seconds for signaling/SMS/EBS.

When there is no time-bound negotiation between the electronic device 100 and the network 400, then it may be up to the electronic device 100 to trigger the service initiation and completion of the service. In these cases, the wireless network 400 may release the resources for lower priority category but may attempt for high priority category services if requested. For example, in case of the first SIM 112a updating no time bound for IMS voice call on the second SIM 112b, then the first SIM 112a may allow only higher priority services than IMS voice call. For lower priority services, the electronic device 100 may need to re-negotiate the time-bound and category ID with network by identifying the completion of service or inability to continue the service (in cases like the electronic device 100 moved to no service or limited service on first SIM 112a where the call cannot be continued, nor update message to fall to default values be informed to network 402 on first SIM 112a).

The information sharing of category ID can be extended to more than 2 SIMs using a single parameter based on the below logic:

1. The method can be applied for SIM in a connected mode or an idle mode.
2. Different Category levels are introduced for convenience based on electronic device vendors and network vendors.
3. Each Category level can be mapped with single or multiple services using direct mapping or different parameters and not limited to QoS, QCI, QFI, nature of the service, etc.
4. Based on the service prioritization, the Category level of these services between the stacks can be dynamically changed (upgraded or downgraded).

Category ID can also represent category of service and service characteristics using a single parameter, since more than one service can be in the same category level, it may be defined such that service characteristics information (nature of service like delay tolerant, robustness, etc.) can also be fetched from the associated category ID. Below are examples in reference table 1:

TABLE 1

| Category | Service characteristics | Delay Tolerance | Expected time | Example service |
| --- | --- | --- | --- | --- |
| 1 | Very high priority, delay intolerant | <30 ms | 00 | EMC/ETWS, CMAS, V2X, Online Realtime gaming |
| 2 | High Priority, | 30 ms~150 ms | 5 min~00 | CS/VoLTE call, |

TABLE 1-continued

| Category | Service characteristics | Delay Tolerance | Expected time | Example service |
|---|---|---|---|---|
| | delay intolerant | | | Application and protocol Signaling, Bank Transactions, SMS OTP from Banks |
| 3 | Moderate Priority, delay-tolerant | 150 ms~300 ms | 2 min~00 | Manual Search, OOS recovery, etc., delay-sensitive PS DATA (online gaming) |
| 4 | Low Priority, delay-tolerant | 300 ms~500 ms | 0-2 min | buffered video streaming, web browsing, TCP-based (e.g. www, e-mail, chat, ftp, p2p file sharing, etc.) |
| 5 | Lowest Priority, delay-tolerant | >500 ms | 0 min | Others |

In an example, the category-ID=FFFF (1 byte MSB represents Category Group ID associated with a particular SIM and 1 byte LSB represents service characteristics information). Category ID will be made of unsigned integer of size 2 bytes (u16). GS is the service group and SC is service characteristics. Example format for Category ID as below:

| GS(1 byte) | SC(1 byte) |
|---|---|

The Category Group ID for the $n^{th}$ SIM (112n) can be derived as below,
I. Sim Number=GS/(number of SIM).
II. Category Group ID=GS %5 assuming the category level is 5. GS % N where N is the number of category level.
III. SC gives the information of Service characteristics and time-bound based on that. Example: if EMC voice call will have 0x1, Normal voice call 0x2 then 0x1 and 0x2 have an infinite time-bound. If 0x3 is signaling then time-bound will be in range of seconds. After this time-bound expiry the electronic device 100 and network should fallback to default values.

Further, the RF controller 110 may be configured to receive an RF request from the first SIM 112a to access the service associated with the first network entity 402 and determine a category of the service to be accessed by the first SIM 112a. Further, the RF controller 110 may be configured to detect a priority associated with the category of the service to be accessed by the first SIM 112a. The RF controller 110 may also be configured to detect whether the priority associated with the category of the service to be accessed by the first SIM 112a is greater or less than the priority associated with the category of a service on-going with the second SIM 112b. If the priority associated with the category of the service to be accessed by the first SIM 112a is less than the priority associated with the category of the service on-going with the second SIM 112b then, the RF controller 110 is configured to grant the RF request of the second SIM 112b to access the service associated with the second network entity 404 and send an update message comprising the category identifier of the service accessed by the second SIM 112b to the second network entity 404.

If the priority associated with the category of the service to be accessed by the first SIM 112a is greater than the priority associated with the category of the at least one service on-going with the second SIM 112b then, the RF controller 110 is configured to reject the RF request of the second SIM 112b to access the service associated with the second network entity 404.

Further, the second network entity 404 is configured to receive the update message comprising the category identifier of the service accessed by the second SIM 112b from the electronic device 100. Further, the second network entity 404 is configured to reject the lower priority services with the second SIM 112b of the electronic device 100 from other entities in the wireless network 400 to avoid the transmission of a paging request to the electronic device 100.

Further, the RF controller 110 is configured to send an RF response to the first SIM 112a to access the service associated with the first network entity 402. The RF controller 110 configures a signalling message comprising a category of service. The category of service indicates a priority of the service to be accessed by the first SIM 112a. Further, the RF controller 110 is configured to send the signalling message including the category of service to the first network entity 402.

When the service is on-going with the second SIM 112b, and the RF controller 110 is configured to send the update message, and to detect a service complete indication in an update message from the first SIM 112a. The RF controller 110 is configured to send an update message indicating the service completion of the first SIM 112a to the second network entity 404. Further, the RF controller 110 is configured to allow the second SIM 112b to resume the service or access a new service with the second network entity 404.

The RF controller 110 may include various circuitry, and/or at least one processor/processing circuitry that executes instructions read from a memory (e.g. memory 120), to carry out the functionality associated therewith as described herein. The processor 122 is configured to execute instructions stored in the memory 120 and to perform various processes. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. (The term "non-transitory" should not be interpreted that the memory 120 is non-movable.) In certain examples, a non-transitory storage medium may store data that can, over time, change (e.g., in Random Access Memory (RAM) or cache).

Although FIG. 6 shows various hardware components of the electronic device 100 it is to be understood that other embodiments are not limited thereto. In other embodiments, the electronic device 100 may include more or fewer components. Further, the labels or names of the components are used only for illustrative purpose and does not limit the scope of the inventive concept. One or more components can be combined together to perform same or substantially similar function to handle the service prioritization.

Figure 7A:
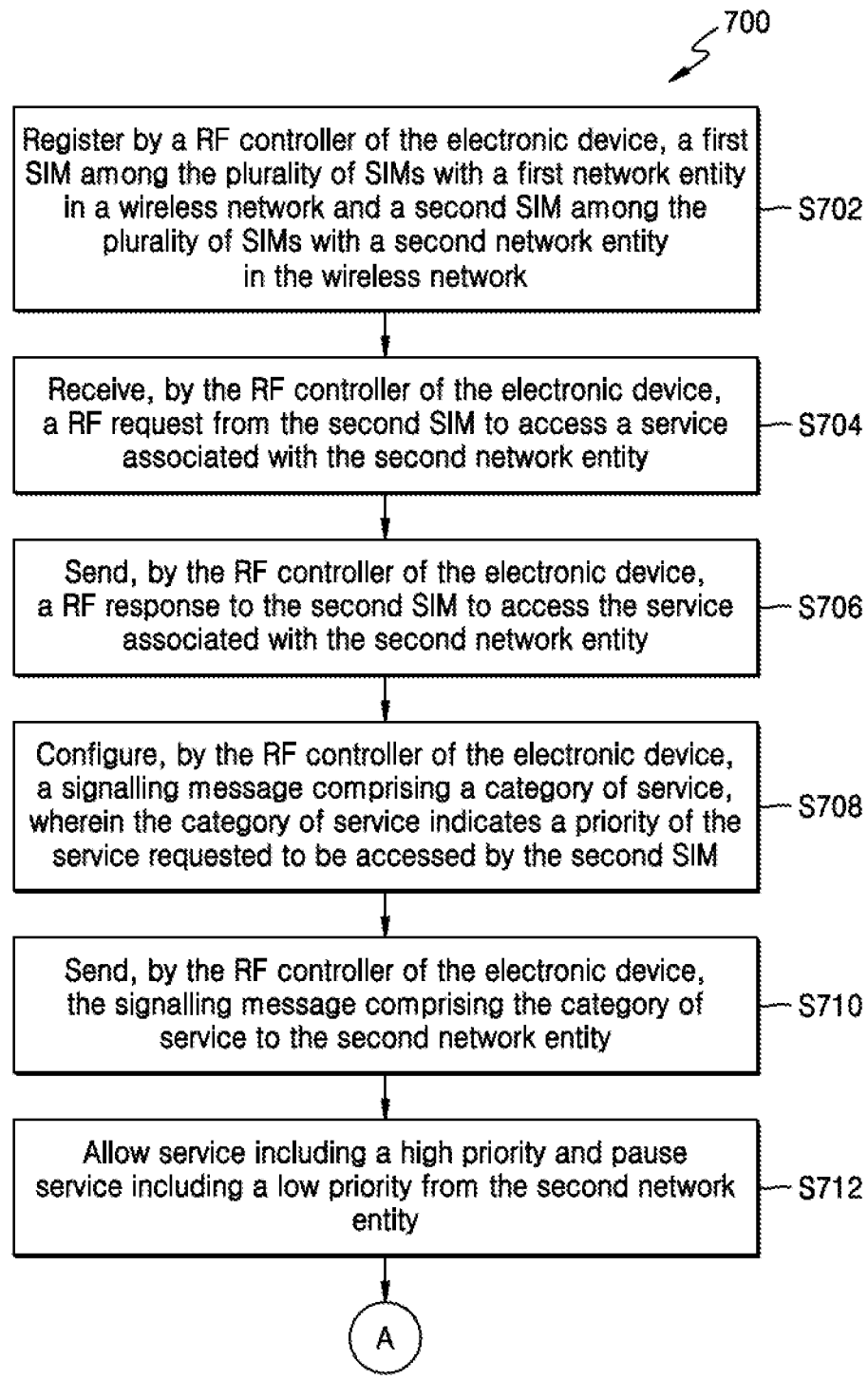
FIGS. 7A and 7B together depict a flow chart illustrating a method for service prioritization in a multi-SIM electronic device, according to an embodiment as disclosed herein.
Figure 7B:
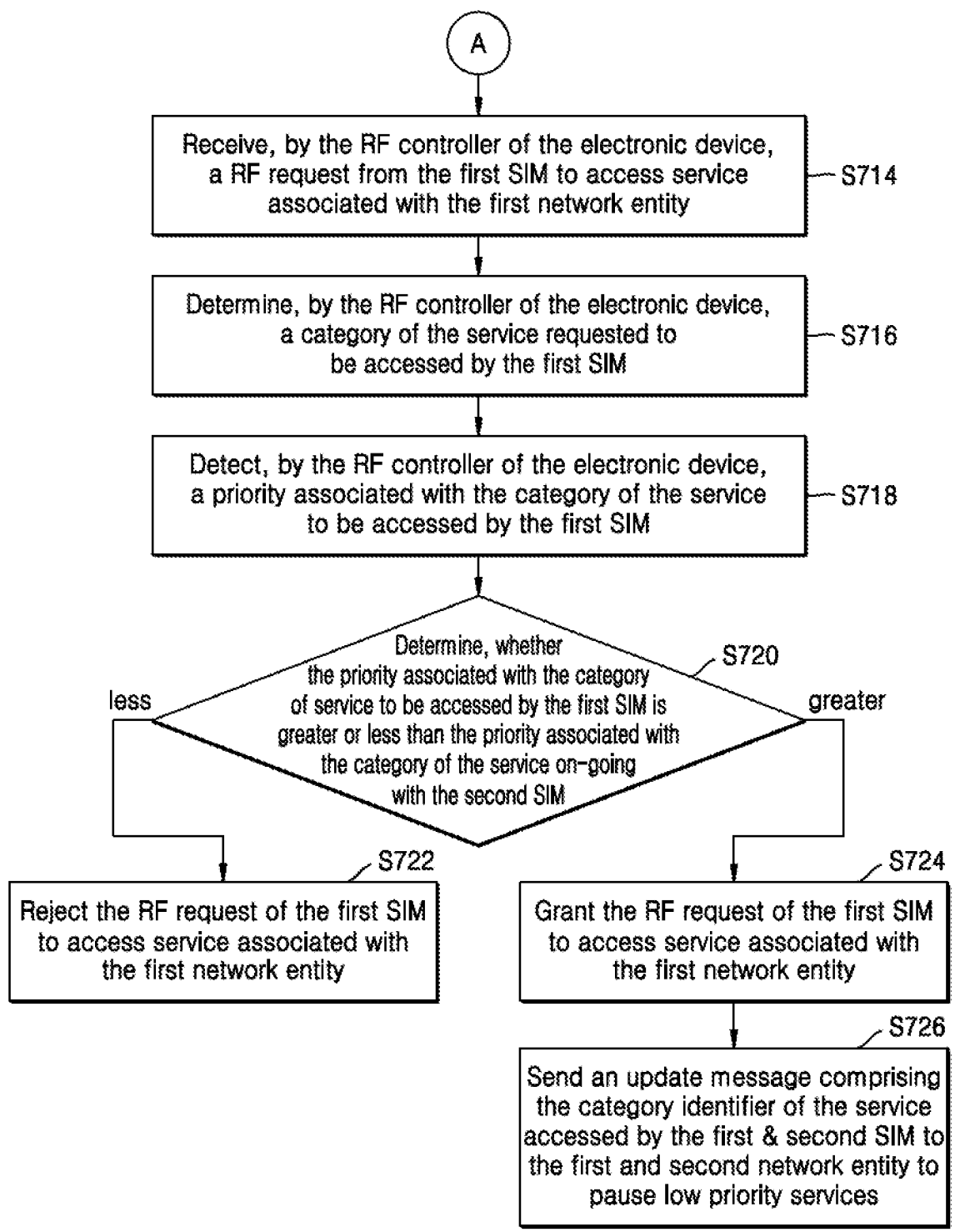

FIGS. 7A and 7B illustrate a flow diagram illustrating an example method 700 for service prioritization in the electronic device 100 comprising the plurality of SIMs 112 114 according to an embodiment as disclosed herein. Operations S702-S726 of method 700 may be handled by the RF controller 110.

At S702, method 700 includes registering the first SIM 112a among the plurality of SIMs 112 with the first network entity 402 in the wireless network 400 and the second SIM 112b among the plurality of SIMs 112 with the second network entity 404 in the wireless network 400. At S704, an RF request may be received from the second SIM 112b to access the service associated with the second network entity. At S706, the RF controller 110 may send a response to the second SIM 112b to access the service associated with the second network entity 404.

At S708, the method includes configuring the signalling message comprising the category of service. The category of service indicates a priority of the service requested to be accessed by the second SIM 112b. At S710, the method includes sending the signalling message comprising the category of service to the second network entity 414. At S712, the method includes allowing a high priority service to proceed and pausing a low priority service, if permitted by the second network entity 404. In other words, the second network entity 404 may respond to the signalling message by indicating that a high priority service corresponding to the category of service in the signalling message is currently permitted. If so, at S712 the electronic device 100 initiates the high priority communication with respect to the second SIM 112b, while pausing an on-going low priority communication with respect to the second SIM 112. Otherwise, the low priority communication may be allowed to continue.

At S714, the method includes receiving the RF request from the first SIM 112a to access service associated with the first network entity 402. At S716, the method includes determining the category of the service to be accessed by the first SIM 112a. At S718, the method includes detecting the priority associated with the category of the service to be accessed by the first SIM 112a. At S720, the method includes determining whether the priority associated with the category of service to be accessed by the first SIM 112a is greater or less than the priority associated with the category of the service on-going with the second SIM 112b.

If the priority associated with the category of the service to be accessed by the first SIM 112a is less than the priority associated with the category of the service on-going with the second SIM then, at S722, the method includes rejecting the RF request of the first SIM 112b to access service associated with the first network entity 402.

If the priority associated with the category of the service to be accessed by the first SIM 112a is less than the priority associated with the category of the service on-going with the second SIM 112b then, at S724, the method includes granting the RF request of the first SIM 112b to access service associated with the first network entity 404. At S726, the method includes sending the update message comprising the category identifier of the service accessed by the first SIM 112a and second SIM 112b to the second network entity 404 similarly update message comprising the category identifier of the service accessed by the second SIM 112b and first SIM112a to the first network entity 402 to pause the low priority services.

Figure 8A:
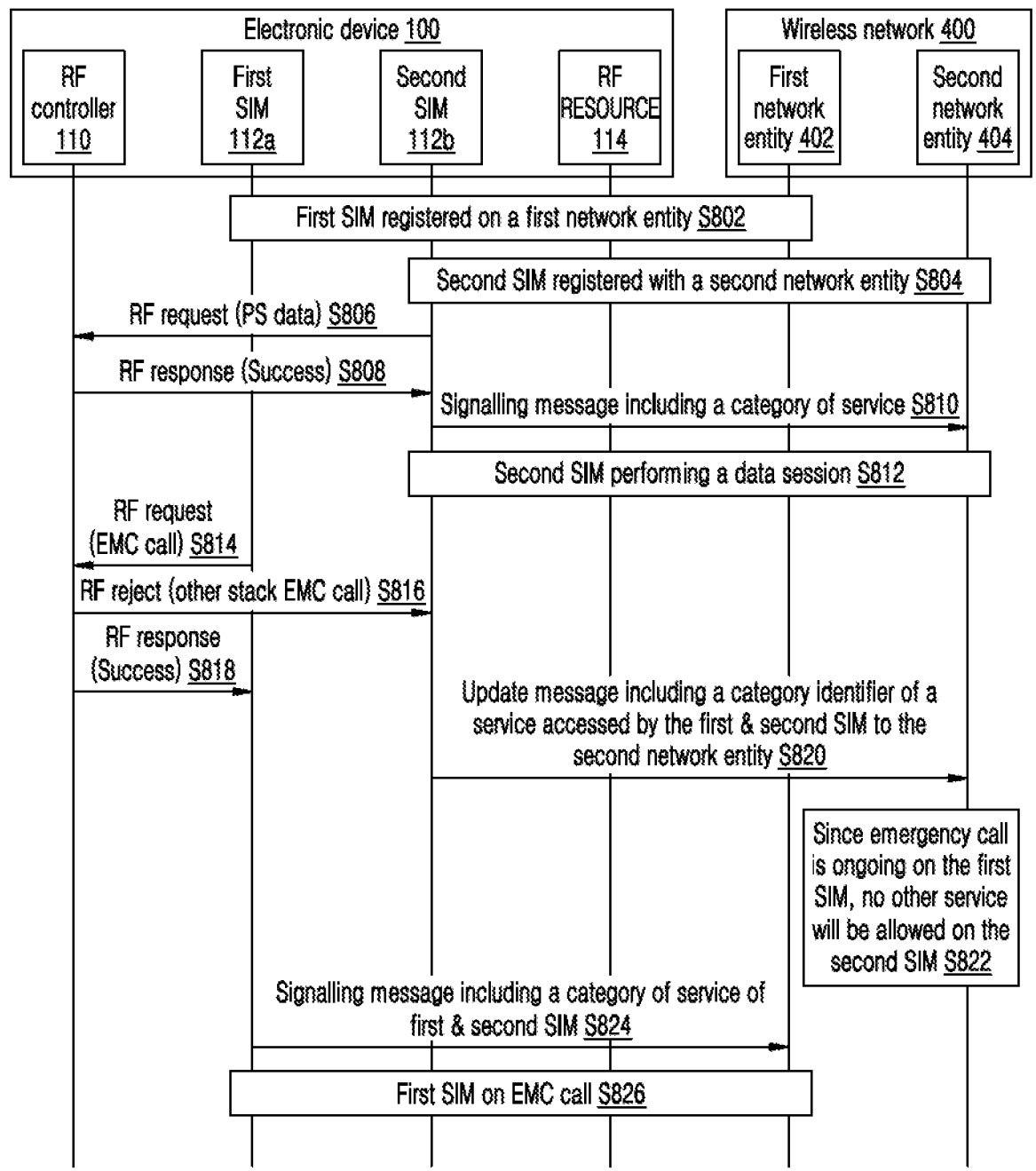
FIGS. 8A and 8B together depict an example sequence diagram illustrating service prioritization in a multi-SIM electronic device, when a first SIM handles an EMC call and a second SIM handles background data, according to an embodiment.
Figure 8B:
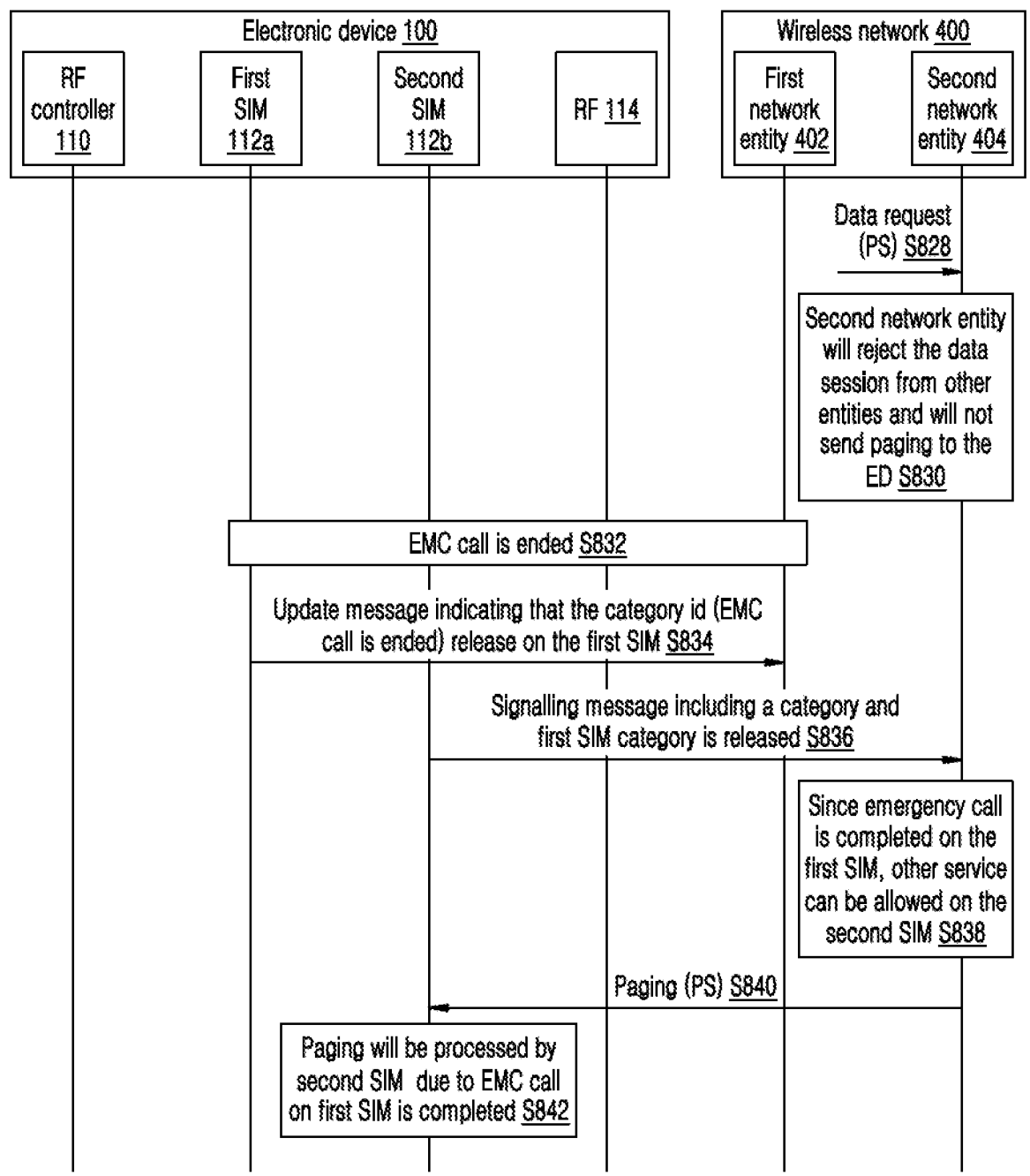

FIGS. 8A and 8B together comprise an example sequence diagram illustrating service prioritization in the electronic device 100 comprising the plurality of SIMs 112 associated with the single RF resource 114, when the first SIM 112a handles an EMC call and the second SIM 112b handles background data, according to an embodiment as disclosed herein.

At S802, the first SIM 112a is registered with the first network entity 402. At S804, the second SIM 112b is registered with the second network entity 404. At S806, the second SIM 112b sends the RF request for the PS data to the RF controller 110. At S808, the RF controller 110 sends the RF response (i.e., success message) to the second SIM 112b based on the RF request.

At S810, the second SIM 112b sends the signaling message including the category of service to the second network entity 404. At S812, the second SIM 112b performs the data session with the second network entity 404. At S814, the first SIM 112a sends an RF request for the EMC call to the RF controller 110. At S816, the RF controller 110 sends an RF reject (including other stack EMC call) to the second SIM 112b. At S818, the RF controller 110 sends an RF response (i.e. success message) to the first SIM 112a.

At S820, the second SIM 112b sends the update message including the category identifier of the service accessed by the first SIM 112a and second SIM 112b to the second network entity 404. At S822, since the emergency call is ongoing on the first SIM 112a, no other service may be allowed on the second SIM 112b. At S824, the first SIM 112a sends the signaling message including the category of service of first SIM 112a and second SIM 112b to the first network entity 402. At S826, the first SIM 112a is on the EMC call.

At S828, the data request is received on the second network entity 404. At S830, the second network entity 112b will reject the data session from other entities and will not send paging to the electronic device 100. At S832, the EMC call is ended between the first SIM 112a and the first network entity 402.

At S834, the first SIM 112a sends the update message indicating that the service associated with the category ID is released (i.e., EMC call is ended) on the first SIM 112a. At S836, the second SIM 112b sends the signaling message including the category of the service and category of the service associated with the first SIM 112a is released. At S838, since the emergency call is completed on the first SIM 112a, other services can be allowed on the second SIM 112b. At S840, the second network entity 404 sends the paging to the second SIM 112b. At S842, the paging will be processed by the second SIM 112b due to the EMC call on the first SIM 112a being completed.

Figure 9A:
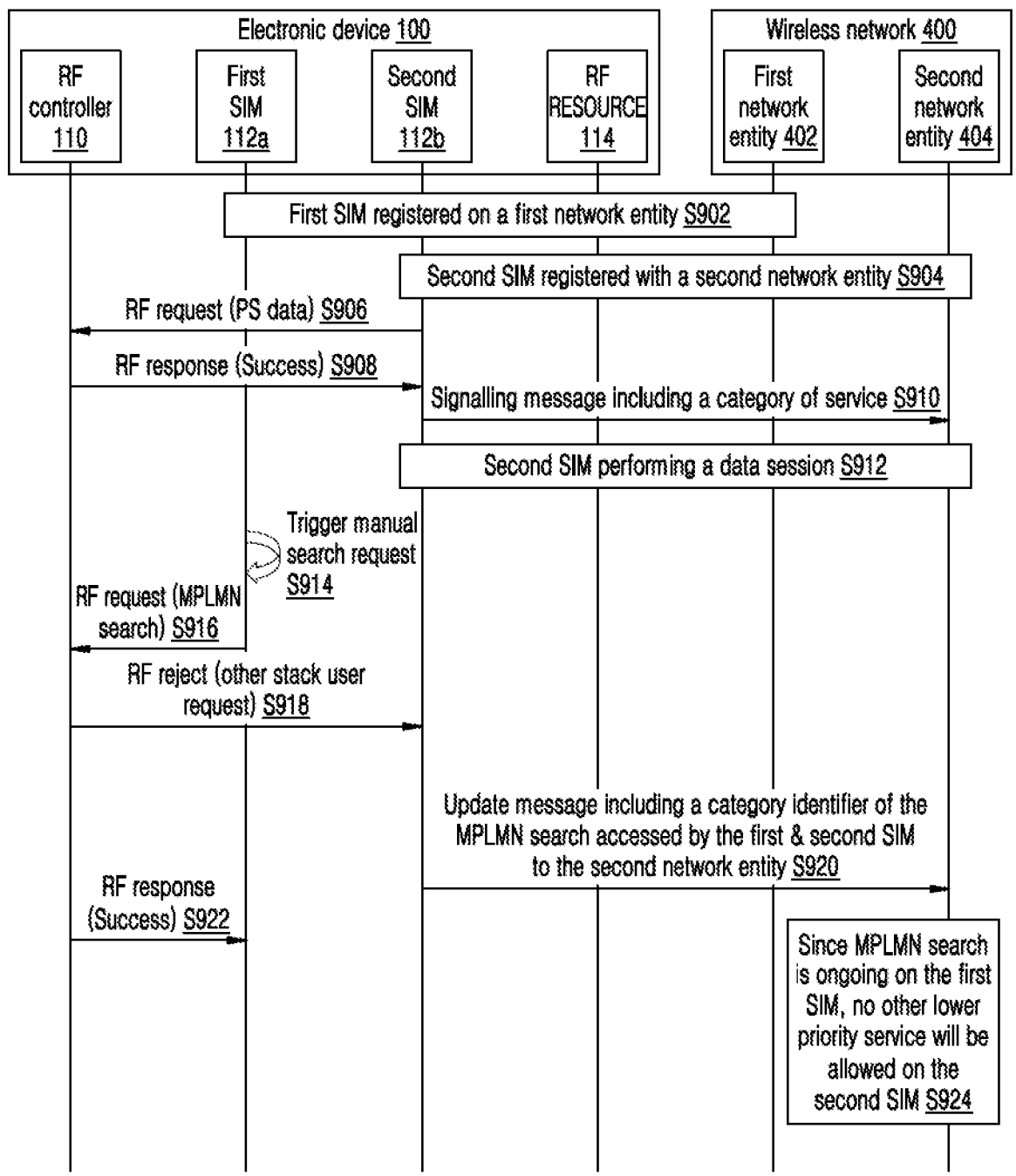
FIGS. 9A and 9B together show an example sequence diagram illustrating service prioritization in a multi-SIM electronic device when a first SIM handles a manual search request and a second SIM performs data session or receives PS paging to initiate data session, according to an embodiment as disclosed herein.
Figure 9B:
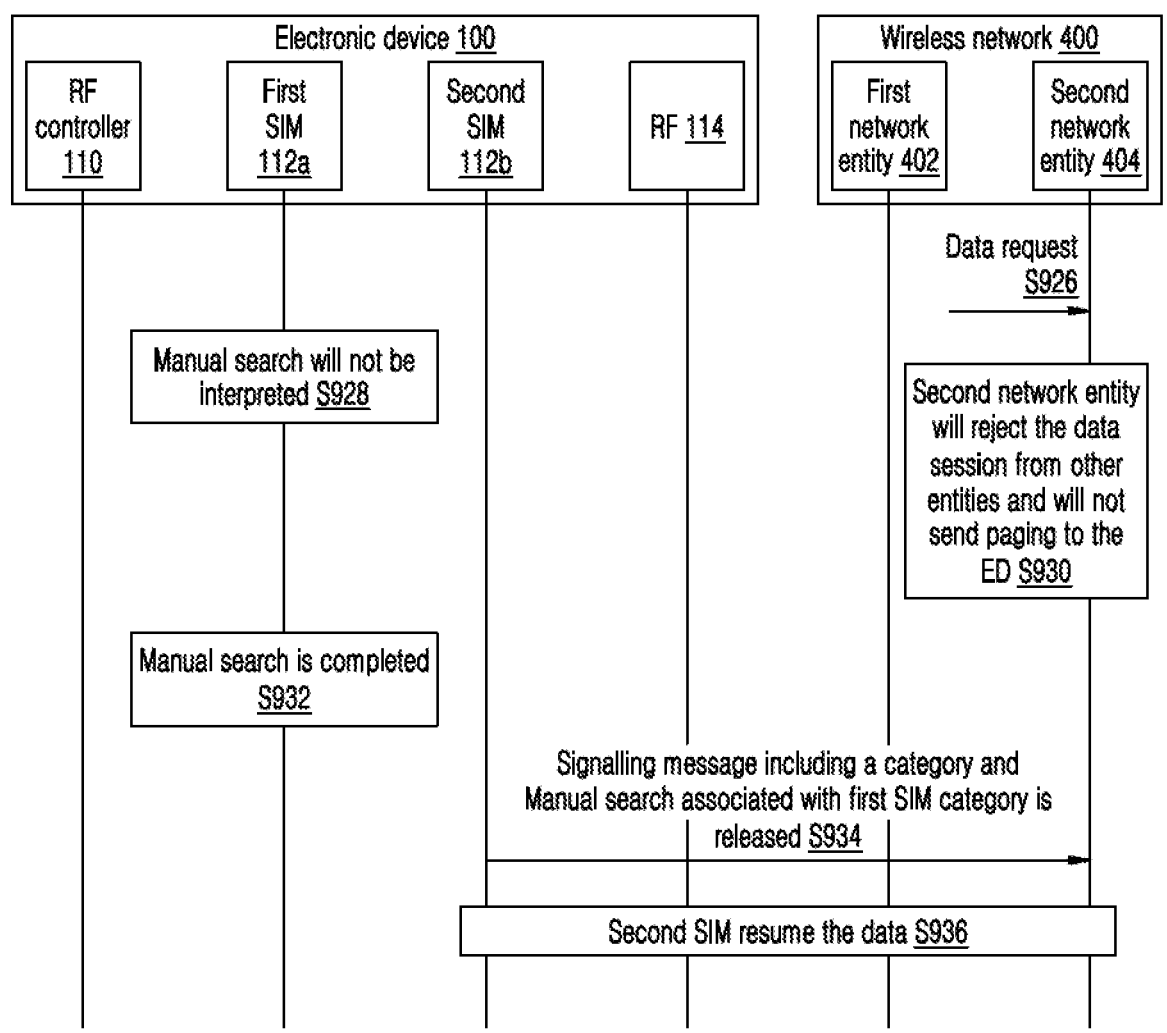

FIGS. 9A and 9B together comprise an example sequence diagram illustrating the service prioritization in the electronic device 100 comprising the plurality of SIMs 112 associated with the single RF resource 114, when the first SIM 112a handles a manual search request and the second SIM 112b performs data session or receives PS paging to initiate data session, according to an embodiment as disclosed herein.

At S902, the first SIM 112a is registered with the first network entity 402. At S904, the second SIM 112b is registered with the second network entity 404. At S906, the second SIM 112b sends the RF request for the PS data to the RF controller 110. At S908, the RF controller 110 sends the RF response (i.e., success message) to the second SIM 112b based on the RF request. At S910, the second SIM 112b sends the signaling message including the category of service to the second network entity 404.

At S912, the second SIM 112b performs the data session with the second network entity 404. At S914, the first SIM 112a triggers the manual search requested by the user of the electronic device 100. At S916, the first SIM 112a sends the RF request for the MPLMN search to the RF controller 110. At S918, the RF controller 110 sends the RF reject (including other stack user MPLMN request) to the second SIM 112b.

At S920, the second SIM 112b sends the update message including the category identifier of the MPLMN search accessed by the first SIM 112a to the first network entity 402 along with current service associated the category id of the second SIM 112b. At S922, the RF controller 110 sends RF response (i.e. success message) to the first SIM 112a.

At S924, since the MPLMN search is ongoing on the first SIM 112a, no other service may be allowed on the second SIM 112b. At S926, the data request is received on the second network entity 404. At S928, the manual search will not be interrupted at the first SIM 112a. At S930, the second network entity 112b will reject the data session from other entities and will not send paging to the electronic device 100. At S932, the manual search is completed.

At S934, the second SIM 112b sends the signaling message including the category of the service, and the manual search associated with the first SIM 112a is released. At S936, the second SIM 112b resumes the data with the second network entity 404.

Figure 10A:
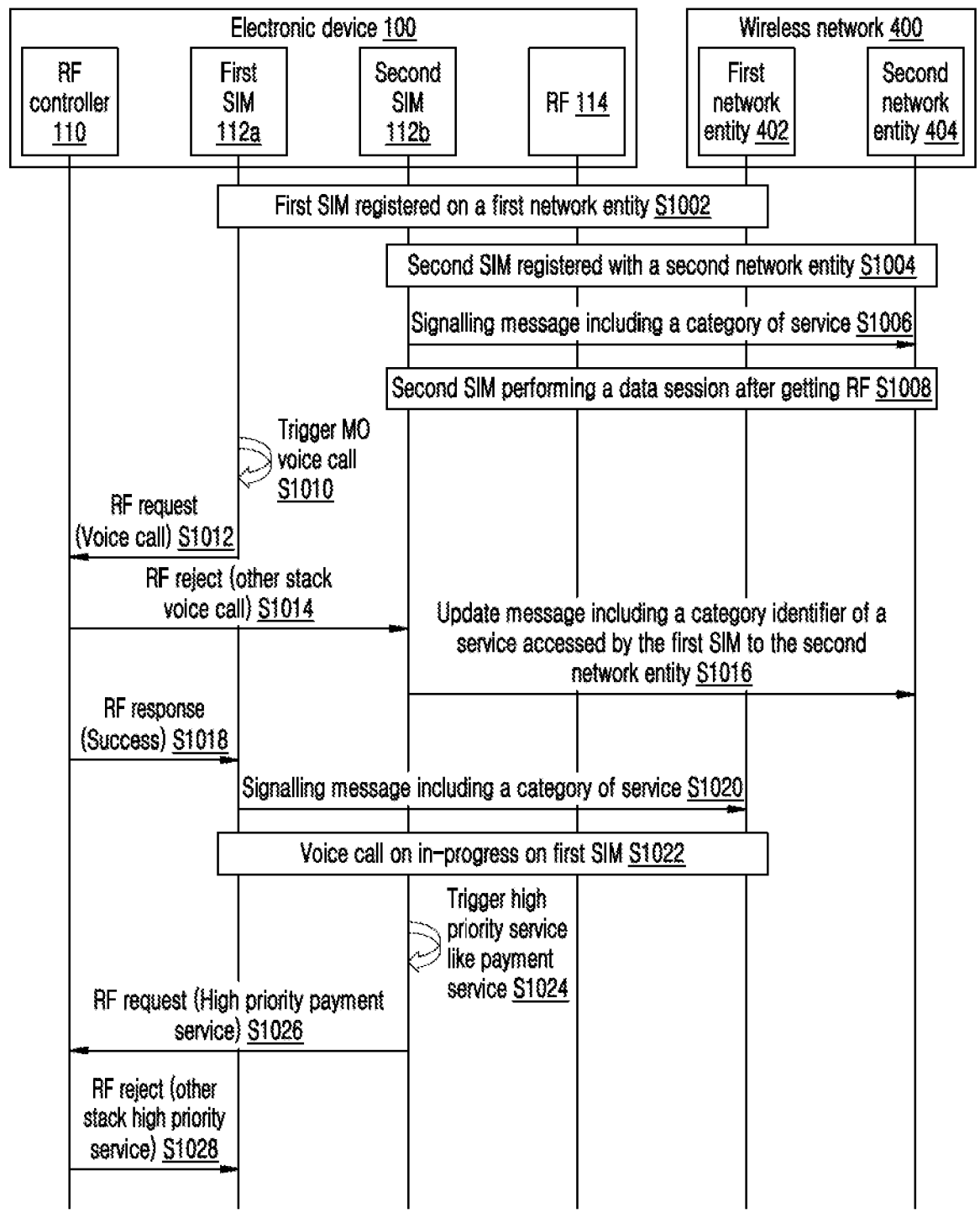
FIGS. 10A and 10B together show an example sequence diagram illustrating service prioritization in a multi-SIM electronic device when the first SIM handles a voice call and a second SIM initially handles background data and then handles a financial payment transaction requested by the user of the electronic device, according to an embodiment as disclosed herein.
Figure 10B:
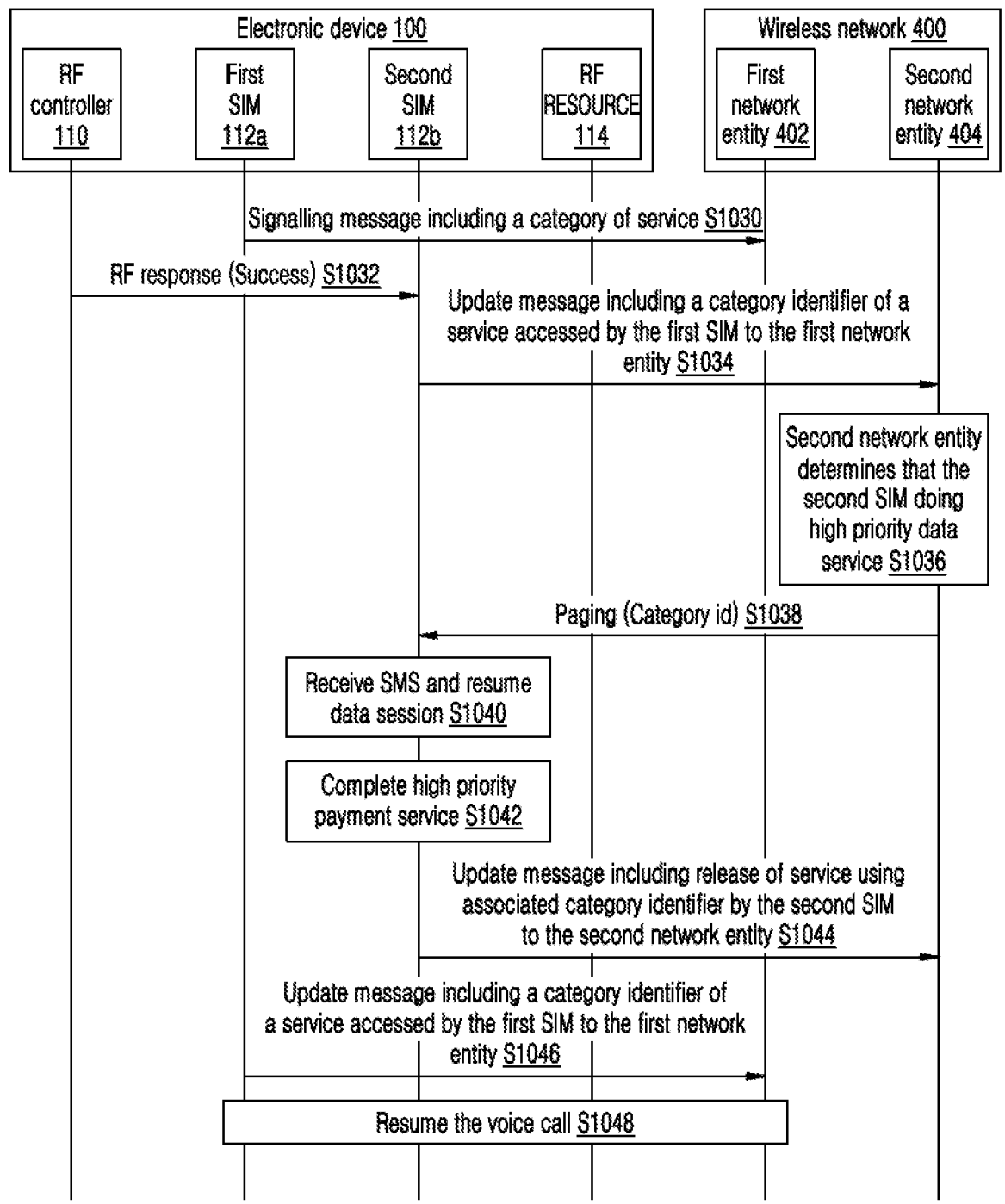

FIGS. 10A and 10b together comprise an example sequence diagram illustrating the service prioritization in the electronic device 100 comprising the plurality of SIMs (112) associated with the single RF resource 114, when the first SIM 112a handles the voice call and the second SIM 112b initially handles background data and then handles a financial payment transaction requested by the user of the electronic device 100, according to an embodiment as disclosed herein.

At S1002, the first SIM 112a is registered with the first network entity 402. At S1004, the second SIM 112b is registered with the second network entity 404. At S1006, the second SIM 112b sends the signaling message including the category of service to the second network entity 404. At S1008, the second SIM 112b performs the data session after an RF channel is established for it.

At S1010, the first SIM 112a triggers the voice call requested by the user of the electronic device 100. At S1012, the first SIM 112a sends the RF request for the voice call to the RF controller 110. At S1014, the RF controller 110 sends the RF reject (including other stack of the voice call request) to the second SIM 112b. At S1016, the second SIM 112b sends the update message including the category identifier of the voice call accessed by the first SIM 112a to the second network entity 402.

At S1018, the RF controller 110 sends the RF response (i.e., success message) for the voice call to the first SIM 112a. At S1020, the first SIM 112a sends the signaling message including the category of service to the first network entity 402. At S1022, the voice call is in-progress on the first SIM 112a. At S1024, the second SIM 112b trigger the high priority service as deemed by user or AP (e.g., payment service) of the electronic device 100. At S1026, the second SIM 112b sends the RF request for data (which is high priority payment service) to the RF controller 110. At S1028, the RF controller 110 sends a RF reject (other stack indicates the high priority service) to the first SIM 112a. At S1030, the second SIM 112b sends the signaling message including the upgraded category id for the data session service to the second network entity 404 to prioritize this service.

At S1032, the RF controller 110 sends the RF response (i.e., success message) to the second SIM 112b. At S1034, the second SIM 112b sends the update message including the category identifier of the voice service accessed by the first SIM 112a to the second network entity 404. At S1036, the second network entity 404 determines that the second SIM 112b doing high priority service than first SIM 112a. At S1038, the second network entity 404 sends the paging message with category id associated with the service requested to the second SIM 112b. At S1040, the second SIM 112b receives the SMS and resume data session required for the payment transaction. At S1042, the second SIM 112b completes the high priority payment service. At S1044, the second SIM 112b sends the update message including release of service using associated category identifier by the second SIM 112b to the second network entity 404. At S1046, the first SIM 112a sends the update message including the category identifier of the service accessed by the first SIM 112a and second SIM 112b to the first network entity 402. At S1048, the first SIM 112a resumes the voice call with the first network entity 402.

Figure 11A:
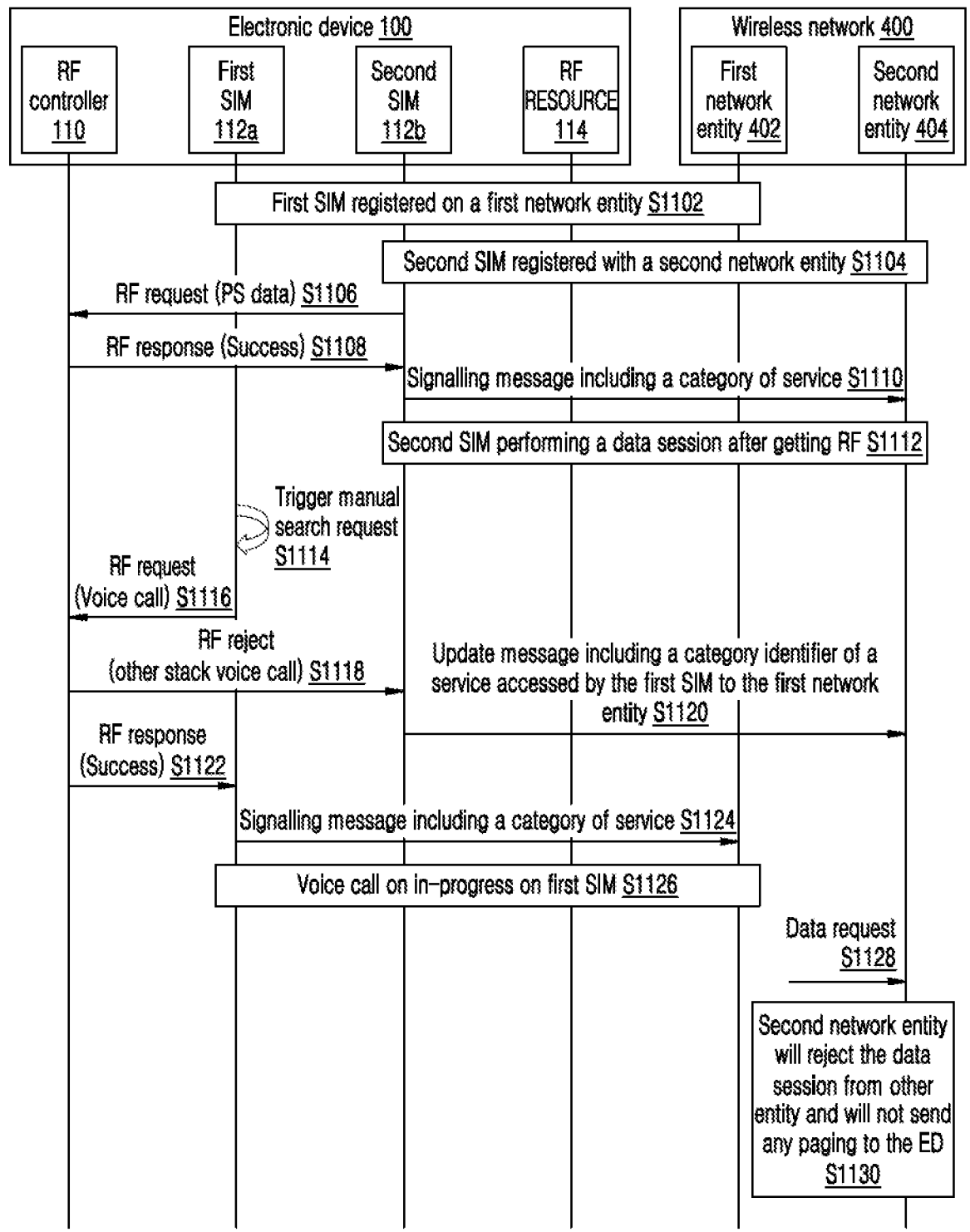
FIGS. 11A and 11B together depict an example sequence diagram illustrating service prioritization in a multi-SIM electronic device when a first SIM handles a voice call and a second SIM handles an emergency call, according to an embodiment as disclosed herein.
Figure 11B:
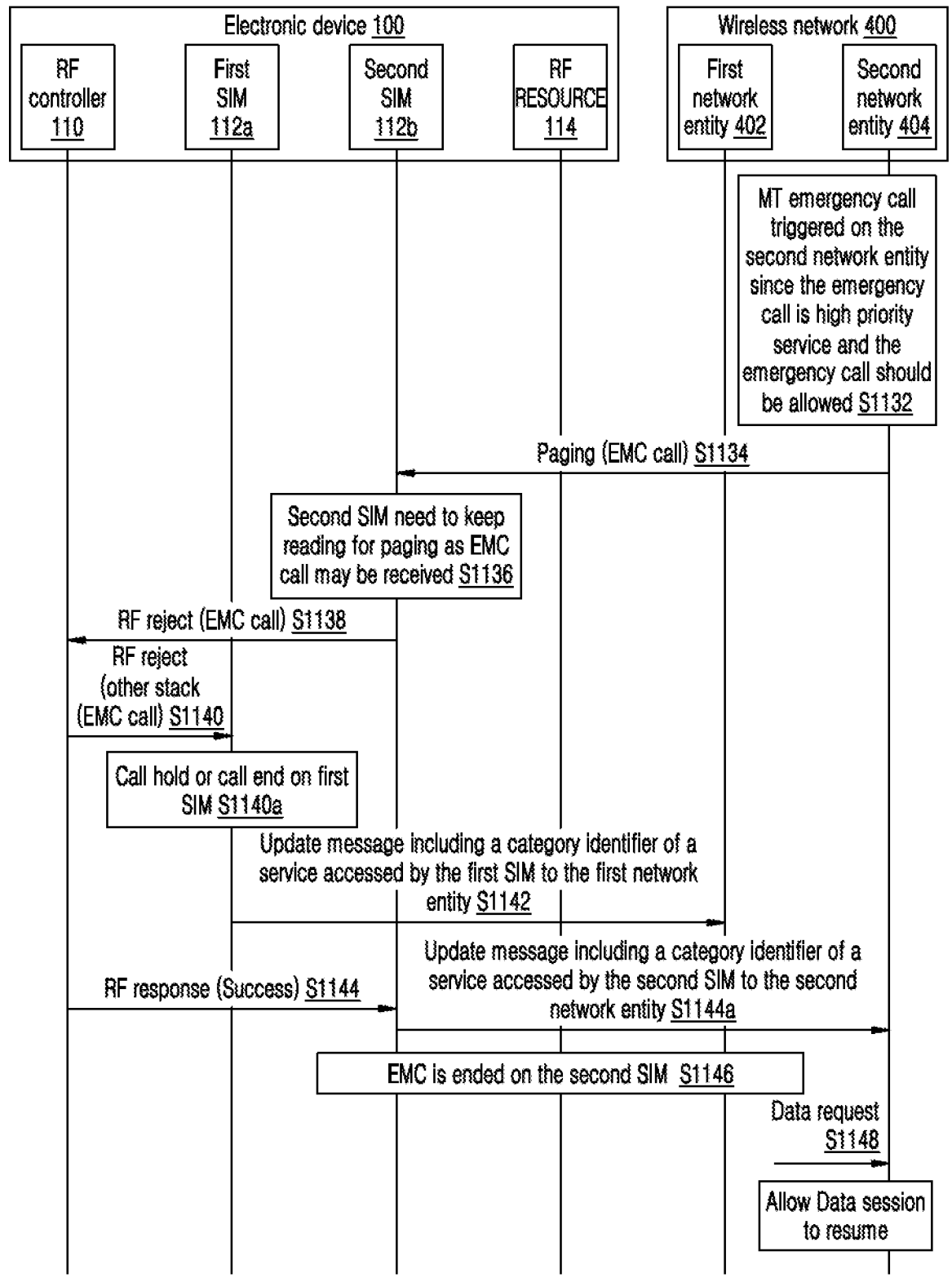

FIGS. 11A and 11B together comprise an example sequence diagram illustrating the service prioritization in the electronic device 100 comprising the plurality of SIMs (112) associated with the single RF resource 114, when the first SIM 112a handles the voice call and the second SIM 112b handles the emergency call, according to an embodiment as disclosed herein.

At S1102, the first SIM 112a is registered with the first network entity 402. At S1104, the second SIM 112b is registered with the second network entity 404. At S1106, the second SIM 112b sends the RF request for the PS data to the RF controller 110. At S1108, the RF controller 110 sends the RF response (i.e., success message) to the second SIM 112b. At S1110, the second SIM 112b sends the signaling message including the category of service to the second network entity 404. At S1112, the second SIM 112b performs the data session after getting RF.

At S1114, the first SIM 112a triggers the MO voice call requested by the user of the electronic device 100. At S1116, the first SIM 112a sends the RF request for the voice call to the RF controller 110. At S1118, the RF controller 110 sends the RF reject (including other stack of the voice call request) to the second SIM 112b. At S1120, the second SIM 112b sends the update message including the category identifier of the voice call accessed by the first SIM 112a to the first network entity 402. At S1122, the RF controller 110 sends the RF response (i.e., success message) for voice call to the first SIM 112a.

At S1124, the first SIM 112a sends the signaling message including the category of service to the first network entity 402. At S1126, the voice call is in-progress on the first SIM 112a.

S1128, the second network entity 404 receives the data request. At S1130, the second network entity 404 will reject the data session from other entity and will not send any paging to the electronic device. At S1132, the emergency call triggered on the second network entity 404 since the emergency call is high priority service and the emergency call should be allowed. At S1134, the second network entity 404 sends the paging with category ID associated with EMC call to the second SIM 112b. At S1136, the second SIM 112b needs to keep reading for paging as higher priority services like EMC call may be received.

At S1138, the second SIM 112b sends the RF request for the EMC call to the RF controller 110. At S1140, the RF controller 110 sends the RF reject (other stack indicates the high priority service) to the first SIM 112a. At S1140a, the call will put on hold or ended. At S1142, the second SIM 112b sends the update message including the category identifier of the voice service accessed by the first SIM 112a and second SIM 112b to the first network entity 402. At S1144, the RF controller 110 sends the RF response (i.e., success message) to the second SIM 112b. At S1144a, the RF controller 110 sends the update message including the category identifier of the voice service accessed by the second SIM 112b and first SIM 112a to the second network entity 404. At S1146, the EMC is ended on the second SIM 112b. At S1148, the second network entity 404 receives the data request and resume the session.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while exemplary embodiments herein have been described those skilled in the art will recognize that the embodiments herein can be practiced with modification within the spirit and scope of the inventive concept as described herein.

We claim:

1. A method for service prioritization performed by an electronic device comprising a plurality of subscriber identity modules (SIMs) and a radio frequency (RF) controller, the method comprising:
registering a first SIM among the plurality of SIMs with a first network entity in a wireless network and a second SIM among the plurality of SIMs with a second network entity in the wireless network, wherein the plurality of SIMs are associated with a single RF resource;
receiving, by the RF controller, a request from the second SIM to access at least one service associated with the second network entity;
sending, by the RF controller a response to the second SIM to access the at least one service associated with the second network entity;
configuring a signalling message comprising a category of service that indicates a priority of the at least one service to be accessed by the second SIM; and
sending the signalling message comprising the category of service to the second network entity.

2. The method of claim 1, further comprising:
receiving, by the RF controller a request from the first SIM to access at least one service associated with the first network entity;
determining a category of the at least one service to be accessed by the first SIM;
detecting a first priority associated with the category of the at least one service requested to be accessed by the first SIM;
detecting whether the first priority is greater or less than a second priority associated with a category of at least one service on-going with the second SIM; and
preforming one of:
rejecting the request of the first SIM to access at least one service associated with the first network entity in response to detecting that the first priority is less than the second priority, and
granting the request of the first SIM to access at least one service associated with the first network entity in response to detecting that the first priority is greater than the second priority.

3. The method of claim 2, further comprising:
receiving, by the second network entity, an update message comprising a category identifier of the at least one service accessed by the first SIM and the second SIM from the electronic device; and
performing, by the second network entity, one of rejecting a lower priority category associated with the service with the second SIM of the electronic device from other entities in the wireless network, avoiding to send a paging request to the electronic device for the service including a lesser priority, allowing a paging request to the electronic device for a service including a higher priority, or sending a paging message comprising a category identifier associated with the service to the electronic device.

4. The method of claim 3, further comprising:
sending, by the RF controller, a response to the first SIM to access the at least one service associated with the first network entity;
configuring, by the electronic device, a signalling message comprising a category of service, wherein the category of service indicates a priority of the at least one service to be accessed by the first SIM, wherein the signalling message comprises reporting of the category of service of other SIMs to the corresponding network entity; and
sending, by the electronic device, the signalling message comprising the category of service to the first network entity.

5. The method of claim 2, further comprising, when the at least one service is on-going with the second SIM and an update message has been sent:
detecting, by the electronic device, a service completion of the first SIM;
sending, by the electronic device, an update message indicating a category identifier of service completion of the first SIM and a category identifier of service being resumed on the second SIM to the first network entity;
sending, by the electronic device, an update message indicating the category identifier of the service completion of the first SIM and the category identifier of service being resumed on the second SIM to the second network entity; and allowing the second SIM to resume the at least one service or access a new service with the second network entity.

6. The method of claim 2, wherein the electronic device dynamically changes a grouping of services based on a higher priority service, and indicates a new category to the first wireless network entity and the second wireless network entity by the first SIM and the second SIM, respectively, to pause a low priority service.

7. The method of claim 2, wherein the electronic device is configured to provide a preconfigure priority of the service irrespective of one of a Quality of Service (QoS) and a QoS flow identifier (QFI) value of the service as decided between the electronic device and an operator of the wireless network.

8. The method of claim 7, wherein, service prioritization is preconfigured by:
assigning a resource based on the service prioritization; and
preconfiguring the service prioritization using the assigned resource based on the category identifier associated with the at least one service.

9. The method of claim 2, wherein the category identifier of the at least one service is determined by a type of the service and a characteristic of the service,
wherein the category identifier of the at least one service is included in the signalling message,
wherein the category identifier of the at least one service is dynamically changed,
wherein the category identifier is directly mapped to the service and defines the priority of the service, and
wherein the category identifier associated with the service is shared by the first network entity or the second network entity to the electronic device in a paging message.

10. The method of claim 1, wherein the signaling message comprise time-bound information, wherein the time-bound information indicates an active time of a change in the category of the service to the second network entity, and
wherein the time-bound information is determined by the category identifier of the at least one service.

11. An electronic device comprising:
a plurality of subscriber identity modules (SIMs) associated with a single radio frequency (RF) resource;
a radio frequency (RF) controller configured to:
register a first SIM among the plurality of SIMs with a first network entity in a wireless network and a second SIM among the plurality of SIMs with a second network entity in the wireless network,
receive a request from the second SIM to access at least one service associated with the second network entity,
send a response to the second SIM to access the at least one service associated with the second network entity,
configure a signalling message comprising a category of service, wherein the category of service indicates a priority of the at least one service to be accessed by the second SIM, and
send the signalling message comprising the category of service to the second network entity.

12. The electronic device of claim 11, wherein the RF controller is configured to:
receive a request from the first SIM to access at least one service associated with the first network entity;
determine a category of the at least one service to be accessed by the first SIM;

detect a priority associated with the category of the at least one service to be accessed by the first SIM;
detect whether the priority associated with the category of the at least one service to be accessed by the first SIM is greater or less than the priority associated with the category of the at least one service on-going with the second SIM; and
perform one of:
reject the request of the first SIM to access at least one service associated with the first network entity in response to detecting that the priority associated with the category of the at least one service to be accessed by the second SIM is greater than the priority associated with the category of the at least one service with the first SIM, and
grant the request of the first SIM to access at least one service associated with the first network entity in response to detecting that the priority associated with the category of the at least one service to be accessed by the second SIM is less than the priority associated with the category of the at least one service with the first SIM, and send an update message comprising the category identifier of the at least one service accessed by the first SIM and the second SIM to the second network entity.

13. The electronic device of claim 12, wherein the second network entity is configured to:
receive the update message comprising the category identifier of the at least one service accessed by the first SIM and the second SIM from the electronic device; and
perform one of rejecting a lower priority category associated with the service with the second SIM of the electronic device from other entities in the wireless network for the service including a lesser priority, allowing a paging request to the electronic device for the service including the higher priority, or avoiding to send a paging request to the electronic device.

14. The electronic device of claim 13, wherein the RF controller is configured to:
send a response to the first SIM to access the at least one service associated with the first network entity;
configure a signalling message comprising a category of service, wherein the category of service indicates a priority of the at least one service to be accessed by the first SIM, wherein the signalling message comprises reporting of the category of service of other SIMs to the corresponding network entity; and
send the signalling message comprising the category of service to the first network entity.

15. The electronic device of claim 12, wherein when the at least one service is on-going with the second SIM, and send the update message, the RF controller is configured to:
detect a service completion of the first SIM;
send an update message indicating the category identifier of the service completion of the first SIM and the category identifier of service being resumed on the second SIM to the first network entity;
send an update message indicating the category identifier of the service completion of the first SIM and the category identifier of service being resumed on second SIM to the second network entity; and
allow the second SIM to resume the at least one service or access a new service with the second network entity.

16. The electronic device of claim 12, wherein the electronic device dynamically changes a grouping of services based on a higher priority category, and indicates a new category to the first wireless network entity and the second wireless network entity by the first SIM and the second SIM to pause a low priority service.

17. The electronic device of claim 12, wherein the electronic device is configured to provide a preconfigure a priority of the service irrespective of a Quality of Service (QoS) and a QoS flow identifier (QFI) value of the service as decided between the electronic device and an operator of the wireless network.

18. The electronic device of claim 17, wherein the service prioritization is preconfigured by:
assigning a resource based on the service prioritization; and
preconfiguring the service prioritization using the assigned resource based on the category identifier associated with the at least one service.

19. The electronic device of claim 12, wherein the category identifier of the at least one service is determined by a type of the service and a characteristics of the service,
wherein the category identifier of the at least one service is included in the signalling message,
wherein the category identifier of the at least one service is dynamically changed,
wherein the category identifier is directly mapped to the service and define the priority of the service, and
wherein the category identifier associated with the service is shared by the first network entity or the second network entity to the electronic device in a paging message.

20. The electronic device of claim 11, wherein the signaling message comprise a time-bound information, wherein the time-bound information indicates an active time of a change in the category of the service to the second network entity, and
wherein the time-bound information is determined by the category identifier of the at least one service.

* * * * *